US011436546B2

(12) United States Patent
Paul et al.

(10) Patent No.: US 11,436,546 B2
(45) Date of Patent: Sep. 6, 2022

(54) OPERATION PLANNING SYSTEM, OPERATION PLANNING DEVICE AND OPERATION PLANNING METHOD

(71) Applicant: KABUSHIKI KAISHA TOSHIBA, Tokyo (JP)

(72) Inventors: Topon Paul, Kanagawa (JP); Shuuichiro Imahara, Kanagawa (JP); Shinichi Nagano, Kanagawa (JP); Yoshiyuki Sakamoto, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 345 days.

(21) Appl. No.: 15/899,935

(22) Filed: Feb. 20, 2018

(65) Prior Publication Data

US 2019/0042990 A1 Feb. 7, 2019

(30) Foreign Application Priority Data

Aug. 7, 2017 (JP) ............................ JP2017-152600

(51) Int. Cl.
*G06Q 10/00* (2012.01)
*G06Q 50/00* (2012.01)
(Continued)

(52) U.S. Cl.
CPC ..... *G06Q 10/0637* (2013.01); *G06Q 10/0631* (2013.01); *G06Q 10/06315* (2013.01); *G06Q 50/06* (2013.01); *H02J 2203/20* (2020.01)

(58) Field of Classification Search
CPC ...... G06Q 50/06; G06Q 10/107; G06Q 10/20; G06Q 50/00; G06Q 50/265
See application file for complete search history.

(56) References Cited

U.S. PATENT DOCUMENTS 6,882,904 B1 4/2005 Petrie et al.
9,630,614 B1 * 4/2017 Hill ...................... F02B 63/047
(Continued)

FOREIGN PATENT DOCUMENTS

JP 3591247 11/2004
JP 2006-50730 A 2/2006
(Continued)

OTHER PUBLICATIONS

Rajesh Kumar et al., "A hybrid multi-agent based particle swarm optimization algorithm for economic power dispatch," Electrical Power and Energy Systems 33 (2011) 115-123.

*Primary Examiner* — Hafiz A Kassim
*Assistant Examiner* — Matheus Ribeiro Stivaletti
(74) *Attorney, Agent, or Firm* — Finnegan, Henderson, Farabow, Garrett & Dunner L.L.P.

(57) ABSTRACT

According to one embodiment, an operation planning system includes a demand information database and a plurality of planning units. The demand information database stores demand data including an overall output required for a plurality of operation units for a planning period in an operation plan. The plurality of planning units adjusts output settings of the plurality of operation units. Any of the planning units selects a combination of operation units which provide the overall output required for the planning period, and based on operation costs depending on the outputs of the operation units, a process is repeated to generate the operation plan, the process including: selection of the operation unit belonging to the combination of operation units; and adjustment of the output setting for the selected operation unit by the planning unit paired with the selected operation unit.

18 Claims, 24 Drawing Sheets

(51) Int. Cl.
*G06Q 10/06* (2012.01)
*G06Q 50/06* (2012.01)

(56) References Cited

U.S. PATENT DOCUMENTS

| | | | | |
|---|---|---|---|---|
| 10,175,660 | B2 | 1/2019 | Kanayama et al. | |
| 10,389,116 | B2 | 8/2019 | Tani | |
| 2002/0120412 | A1* | 8/2002 | Hayashi | H02J 3/00 702/61 |
| 2010/0319747 | A1* | 12/2010 | Wong | H01L 35/30 136/201 |
| 2010/0332272 | A1* | 12/2010 | Ong | F03D 17/00 705/7.36 |
| 2012/0185414 | A1* | 7/2012 | Pyle | G01W 1/10 706/11 |
| 2013/0138468 | A1* | 5/2013 | Oe | G06Q 50/06 705/7.22 |
| 2014/0324237 | A1* | 10/2014 | Oe | G06Q 40/00 700/287 |
| 2015/0012622 | A1* | 1/2015 | Omatsu | G06Q 10/10 709/220 |
| 2015/0316903 | A1* | 11/2015 | Asmus | G06Q 10/06 700/291 |
| 2015/0318698 | A1 | 11/2015 | Tani | |
| 2017/0169344 | A1* | 6/2017 | Mangharam | G06N 5/025 |
| 2017/0207629 | A1* | 7/2017 | Seki | G05B 15/02 |
| 2017/0243290 | A1* | 8/2017 | Brown | G06Q 30/0202 |
| 2017/0302077 | A1* | 10/2017 | Yabe | H02J 3/005 |
| 2017/0302171 | A1* | 10/2017 | Goto | G05B 15/02 |
| 2017/0329908 | A1* | 11/2017 | Braswell | G16H 40/20 |
| 2017/0349058 | A1* | 12/2017 | Bernier | H02J 3/14 |
| 2017/0352010 | A1* | 12/2017 | Son | G06Q 10/20 |
| 2018/0042064 | A1* | 2/2018 | Norton | H05B 47/20 |
| 2018/0152023 | A1* | 5/2018 | Guruprasad | H02J 3/38 |
| 2018/0181153 | A1* | 6/2018 | Takahashi | G05F 1/66 |
| 2018/0284707 | A1* | 10/2018 | Menon | F02C 9/28 |
| 2018/0351367 | A1* | 12/2018 | Kogo | G05B 19/042 |
| 2019/0018394 | A1* | 1/2019 | Sayyarrodsari | G06Q 10/0833 |
| 2019/0122132 | A1* | 4/2019 | Rimini | G06N 7/005 |
| 2019/0267644 | A1* | 8/2019 | Berntsen | B60L 50/72 |
| 2020/0161865 | A1* | 5/2020 | Clifton | H02J 7/0068 |

FOREIGN PATENT DOCUMENTS

| | | | |
|---|---|---|---|
| JP | 2011-113140 | A | 6/2011 |
| JP | 2016-92898 | A | 5/2016 |
| WO | WO 2014/092195 | A1 | 6/2014 |
| WO | WO 2017/090141 | A1 | 6/2017 |

* cited by examiner

91

| # | UNIT-GROUPS FOR EACH PLANNING PERIOD | | | | | EVALUATION SCORE |
|---|---|---|---|---|---|---|
| | p1 | p2 | p3 | p4 | p5 | |
| 1 | X11 | X22 | X31 | X43 | X54 | 100 |
| 2 | X15 | X27 | X31 | X44 | X59 | 90 |
| 3 | X17 | X28 | X36 | X42 | X53 | 80 |
| 4 | X13 | X24 | X33 | X48 | X56 | 130 |
| ... | ... | ... | ... | ... | ... | ... |
| M | X16 | X22 | X33 | X47 | X51 | 105 |

92

| # | UNIT-GROUPS FOR EACH PLANNING PERIOD | | | | | EVALUATION SCORE |
|---|---|---|---|---|---|---|
| | p1 | p2 | p3 | p4 | p5 | |
| 1 | X15 | X26 | X31 | X42 | X53 | 95 |
| 2 | X17 | X28 | X36 | X44 | X57 | 92 |
| 3 | X11 | X21 | X36 | X42 | X53 | 85 |
| 4 | X12 | X28 | X31 | X43 | X54 | 70 |
| ... | ... | ... | ... | ... | ... | ... |
| Q | X14 | X23 | X32 | X48 | X55 | 89 |

93

| # | UNIT-GROUPS FOR EACH PLANNING PERIOD | | | | | EVALUATION SCORE |
|---|---|---|---|---|---|---|
| | p1 | p2 | p3 | p4 | p5 | |
| 1 | X15 | X27 | X31 | X44 | X59 | 90 |
| 2 | X17 | X28 | X36 | X42 | X53 | 80 |
| 3 | X15 | X26 | X31 | X42 | X53 | 95 |
| 4 | X17 | X28 | X36 | X44 | X57 | 92 |
| 5 | X11 | X21 | X36 | X42 | X53 | 85 |
| 6 | X12 | X28 | X31 | X43 | X54 | 70 |
| ... | ... | ... | ... | ... | ... | ... |
| M | X14 | X23 | X32 | X48 | X55 | 89 |

| UNIT ID(i) | MINIMUM GENERATED POWER $P_{min}$ | MAXIMUM GENERATED POWER $P_{max}$ | RATE OF CHANGE FOR THE GENERATED POWER $\Delta P$ | MINIMUM UPTIME | MINIMUM DOWNTIME | COLD START-UP COST (CSC) | HOT START-UP COST (HSC) | SHUT-DOWN COST (SDC) | a | b | c | e | $\rho$ |
|---|---|---|---|---|---|---|---|---|---|---|---|---|---|
| 0001 | 100 | 300 | 20 | 10 | 5 | 50 | 30 | 20 | 0.00030 | 8.10 | 560 | 300 | 0.037 |
| 0002 | 50 | 200 | 10 | 8 | 4 | 45 | 25 | 22 | 0.00060 | 8.20 | 310 | 200 | 0.045 |
| 0003 | 10 | 100 | 10 | 10 | 5 | 47 | 22 | 35 | 0.00060 | 8.30 | 320 | 200 | 0.048 |
| 0004 | 0 | 50 | 5 | 4 | 2 | 78 | 60 | 25 | 0.00325 | 7.74 | 250 | 160 | 0.067 |
| 0005 | 0 | 200 | 10 | 10 | 5 | 100 | 80 | 23 | 0.00325 | 8.75 | 250 | 160 | 0.065 |
| 0006 | 10 | 300 | 10 | 10 | 4 | 77 | 57 | 26 | 0.00325 | 7.47 | 250 | 160 | 0.065 |
| 0007 | 100 | 400 | 20 | 15 | 5 | 90 | 70 | 19 | 0.00325 | 8.74 | 250 | 160 | 0.065 |
| 0008 | 20 | 200 | 10 | 8 | 4 | 45 | 35 | 36 | 0.00325 | 9.74 | 250 | 160 | 0.065 |
| 0009 | 10 | 100 | 5 | 6 | 3 | 65 | 52 | 28 | 0.00325 | 7.77 | 250 | 160 | 0.065 |
| 0010 | 0 | 200 | 10 | 5 | 3 | 78 | 60 | 29 | 0.00285 | 8.65 | 125 | 110 | 0.085 |

FIG. 13

| FACTORY | PRODUCTION CAPACITY | PRODUCTION COST | PRODUCTION TIME | MAXIMUM UPTIME | MINIMUM UPTIME | TRANSPORTATION COST | COST IN INACTIVE STATE | MAINTENANCE TIME | MAINTENANCE COST |
|---|---|---|---|---|---|---|---|---|---|
| #1 | 400 | 90 | 5 | 15 | 3 | 50 | 200 | 5 | 35 |
| #2 | 300 | 80 | 6 | 12 | 5 | 100 | 190 | 7 | 20 |
| #3 | 210 | 70 | 7 | 9 | 4 | 70 | 160 | 8 | 45 |
| #4 | 120 | 60 | 8 | 8 | 2 | 90 | 150 | 10 | 40 |
| #5 | 550 | 120 | 4 | 20 | 5 | 80 | 250 | 6 | 30 |

OPERATION PLANNING SYSTEM, OPERATION PLANNING DEVICE AND OPERATION PLANNING METHOD

CROSS-REFERENCE TO RELATED APPLICATIONS

This application is based upon and claims the benefit of priority from Japanese Patent Application No. 2017452600, filed on Aug. 7, 2017; the entire contents of which are hereby incorporated by reference.

FIELD

Embodiments described herein relate generally to an operation planning system, an operation planning device and an operation planning method.

BACKGROUND

It is common to have multiple units operating cooperatively to satisfy the desired output, in various fields. For example, in electric power systems, multiple power stations are combined to provide electricity sufficient to fulfill the demand. In manufacturing, multiple factories, production facilities, processes or the like are combined to meet the production requirement. For swarm robotics, a plurality of robots operates cooperatively to complete tasks.

In a system including a plurality of units, the process of generating an operation plan is often concentrated in the central management server. This is time consuming because the management server collects all the information for each unit before generating operation plans which satisfies the restrictions. If there are changes in required output, addition of units, failure of units or the like during the operation of the system, there is a risk that the system cannot catch up with the changes. Also, the behavior of each unit may change, increasing operation costs, if the system is operating according to an old plan. Since the generation of the operation plan, is time-consuming, it is difficult to increase the number of units in a system.

BRIEF DESCRIPTION OF THE DRAWINGS

FIG. 13 is a diagram showing an example of operation condition data for an electric power station;

DETAILED DESCRIPTION

According to one embodiment, an operation planning system includes a demand information database and a plurality of planning units. The demand information database stores demand data including an overall output required from a plurality of operation units for a planning period in an operation plan. The plurality of planning units adjust output settings of the plurality of operation units. Any of the planning units selects a combination of operation units which provide the overall output required for the planning period, and based on operation costs depending on the outputs of the operation units, a process is repeated to generate the operation plan, the process including: selection of the operation unit belonging to the combination of operation units; and adjustment of the output setting for the selected operation unit by the planning unit paired with the selected operation unit.

Hereinafter, embodiments of the present invention will be described with reference to the drawings.

First Embodiment

Figure 1:
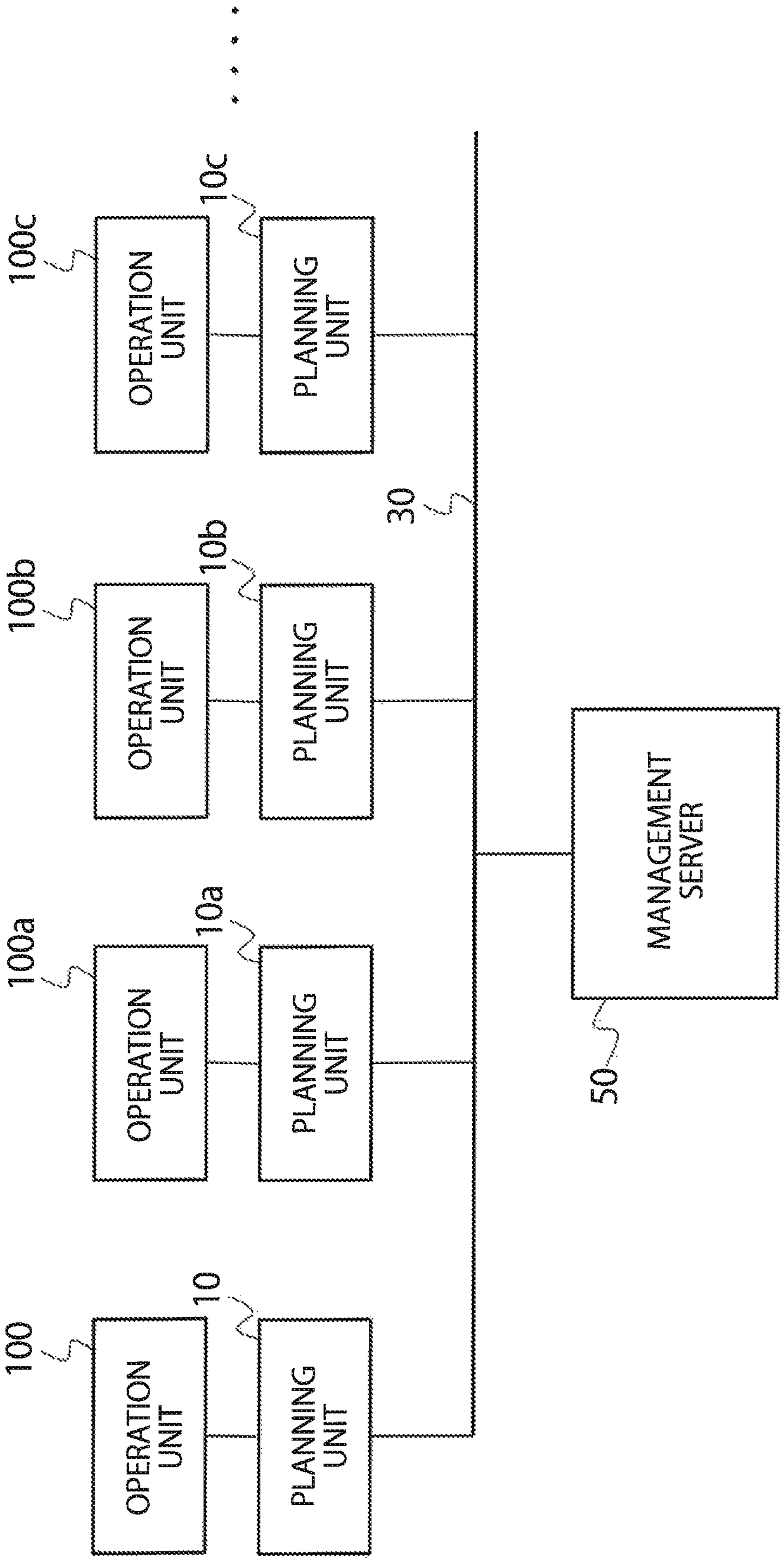
FIG. 1 is a diagram showing an operation planning system according to a first embodiment.

FIG. 1 is a block diagram showing a schematic configuration of an operation planning system according to a first embodiment. An operation planning system according to a first embodiment will be described with reference to FIG. 1.

The operation planning system in FIG. 1 includes a planning unit 10, a planning unit 10*a*, a planning unit 10*b*, a planning unit 10*c*, an operation unit 100, an operation unit 100*a*, an operation unit 100*b*, an operation unit 100*c* and a management server 50. The planning units 10, 10*a*, 10*b*, 10*c* and the management server 50 are connected to each other via a network 30.

Each operation unit is combined with at least one planning unit. Thus, the planning unit 10 and the operation unit 100 form a pair. Also, the planning unit 10*a* and the operation unit 100*a*, the planning unit 10*b* and the operation unit 100*b*, the planning unit 10*c* and the operation unit 100*c* from pairs, respectively. In the system illustrated in FIG. 1, each of the operation units is paired with only one planning unit. However, it is possible to combine more than two planning units with an operation unit. In the system of FIG. 1, there are four pairs of planning units and operation units. The number of pairs may be greater or smaller.

The planning unit 10 is an operation planning device which cooperates with other planning units and generates an operation plan for an operation unit. The planning unit 10 also performs control tasks of the operation units, including starts, stops, output changes or the like. After the operation plan is generated, the operation unit 100 that is paired is launched, according to the operation plan. The planning unit 10 is an information processing device such as a computer including more than 1 CPU (Central Processing Unit), a storage and a communication unit. The planning unit 10 is capable of running an OS (Operating System) and an application. Details of the planning unit 10 are mentioned later. The features and the configurations of the other operation units 10*a*, 10*b* and 10*c* are similar to that of the operation unit 10.

Below, each planning unit is paired with a specific operation unit. Namely, each planning unit controls a single operation unit in the following description. Nonetheless, it is possible to adopt a configuration where a single planning unit controls multiple operation units. Furthermore, the same operation unit can be controlled by multiple planning units. It is possible to make planning units which control multiple operation units redundant. Thus, the invention according to the embodiment can be applied, as long there is some coupling relation between the planning units and the operation units.

The network 30 enables communication of data between each of the planning units. The network 30 also enables communication of data between each planning unit and the management server 50. The communication media of the network 30 can be optical fibers, LAN cables, telephone lines, coaxial cables, wireless or the like. An example of communication standard is Ethernet but any standard could be used.

The management server 50 manages data shared between each planning unit. The management server 50 is an information processing device such as a computer including more than one CPU (Central Processing Unit), a storage and a communication device. The management server 50 is capable of running an OS (Operating System) and an application. Each planning unit generates operation plans based on the data stored in the management server. The management server 50 is not limited to a specific location or configuration. The management server 50 can be physically independent from the planning unit. The management server 50 can be implemented in the same hardware as any of the planning units. Details on the management server are described later.

The management server 50 can be a physical computer, a virtual machine (VM), a container or a combination of these. The features of the management server 50 can be distributed to more than one physical computer, virtual machine or a container. For the sake of higher availability and load balancing, a plurality of management servers 50 can be used.

The operation unit 100 is an electric power station or an electric power generator which generates electricity based on an operation plan. The power generation method of the operation unit 100 can be thermal, nuclear, hydroelectric, pumped-storage, solar, wind power, geothermal or any other method. If thermal power is used, coal, oil, gas, biomass, or various wastes can be used as fuel. Nonetheless, any type of fuel can be used.

The operation planning system in FIG. 1 can include more than one type of electric power stations. Thus, operation units 100, 100*a*, 100*b* and 100*c* can be different types of electric power stations (power generators). Also, the same type of electric power station (power generator) can be used for different operation units. Electric power stations (power generators) of different specifications, designs, scales and age can coexist. For example, if there are electric power stations (power generators) of the same type, the characteristics, output and the operation cost may vary.

In the embodiment, the operation units are electric power stations (power generators). However, the operation units can take other forms. For example, factories, plants, production facilities, processes, robots, air conditioning equipment can be combined with planning units and operate.

Figure 2:
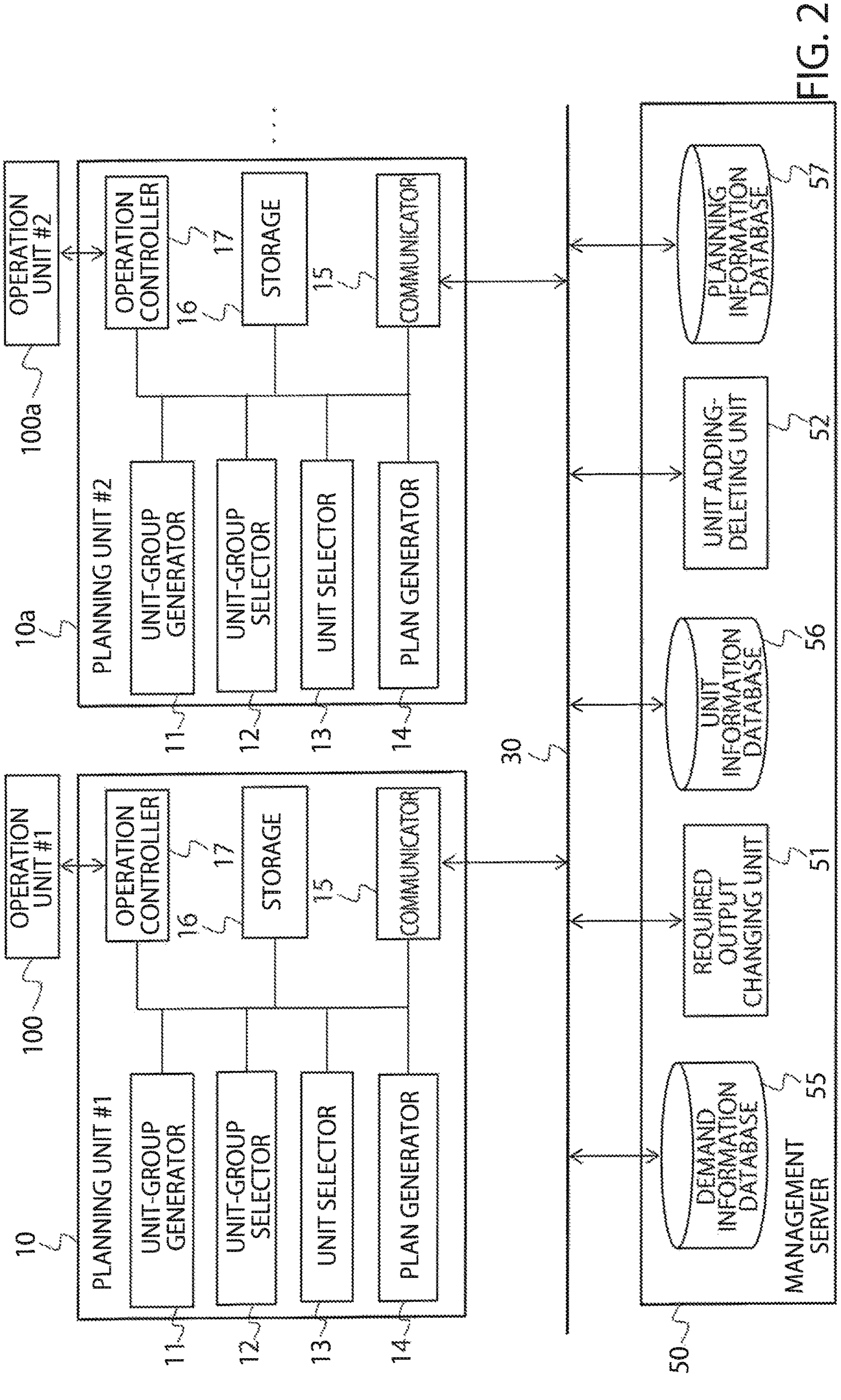
FIG. 2 is a diagram showing components of the operation planning system according to the first embodiment.

FIG. 2 is a diagram showing components of the operation planning system according to the first embodiment. Below, the components of the system according to the embodiment are described in reference to FIG. 2.

In FIG. 2 the planning unit 10 (planning unit #1) and operation unit 100 (operation unit #1) are paired. The planning unit 10*a* (planning unit #2) and operation unit 100*a* (operation unit #2) are also paired. Although not illustrated in FIG. 2, it is possible to have other pairs of planning units and operation units, such as the pair of a planning unit #3 and an operation unit #3, for the system according to the embodiment.

The management server 50 includes a required output changing unit 51, a unit adding-deleting unit 52, a demand information database 55, a unit information database 56, a planning information database 57.

The demand information database 55 stores demand data which is the required output (overall output) of the whole system for each date and time. In the following, this overall output of the whole system is called the required output. Depending on the applications and conditions, different values can be used for the required output. For example, for the required output, it is possible to use the total output of all the operation units. Also, it is possible to use the expected value for the output of units, the maximum value, the minimum value, or the processed values of the aforementioned values. The required output can be in either scalar quantities or vector values.

Thus, required output can be in any format. Any calculation can be used for processing values. Also, various conditions may be set to the required output. Conditions may be set to the output of the whole system. For example, if thermal power is used, there may be conditions such as the maximum output, the minimum output or ratios set for the type of fuel such as coal, liquefied natural gas, oil or the like.

Figure 3:
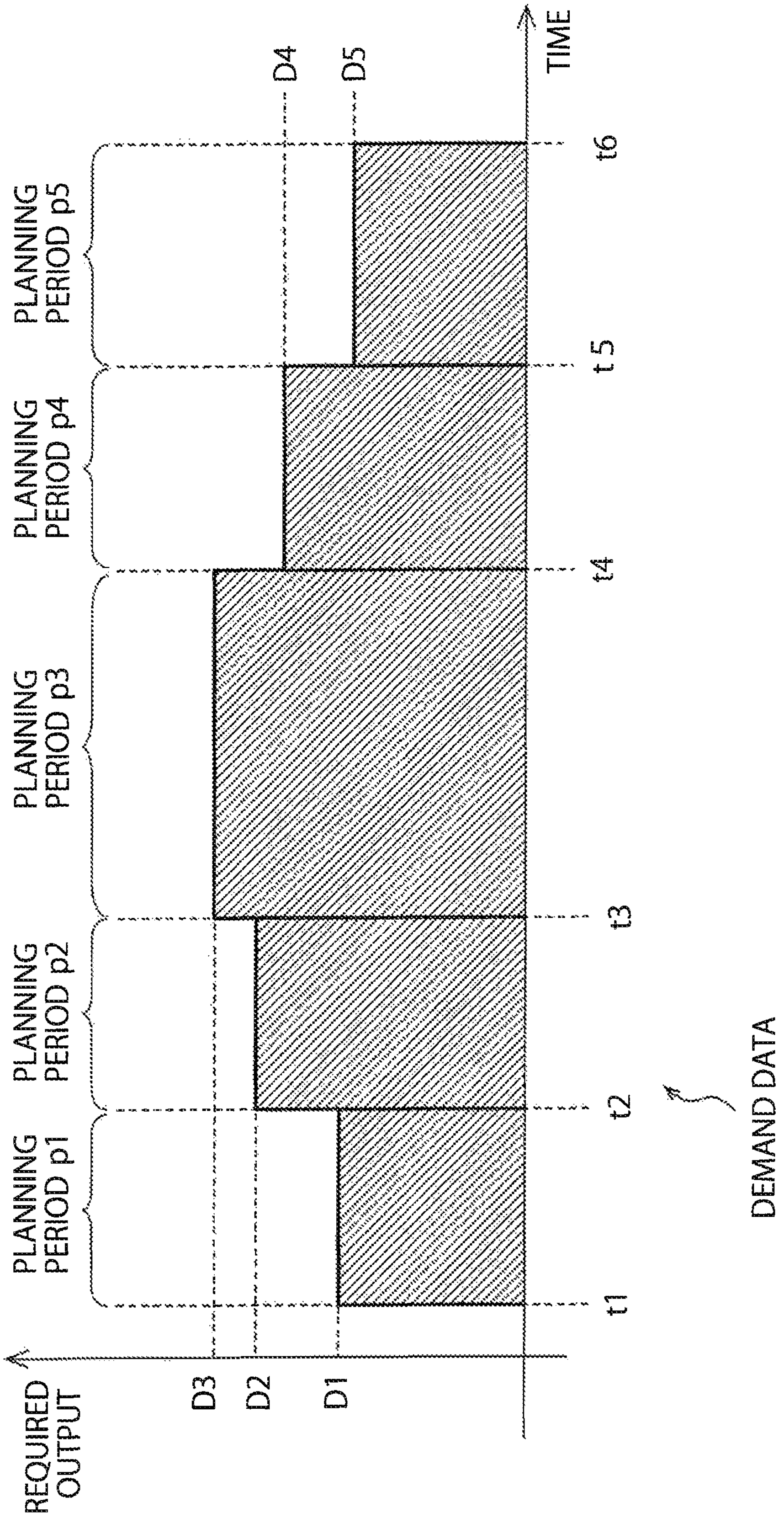
FIG. 3 is a diagram showing an example of demand information.

FIG. 3 is an example of the demand data stored in the demand information database 55. The vertical axis represents the required output. The horizontal axis represents the time. If the system is applied to electric power systems, the required output is the electric power that needs to be supplied. The time is divided into multiple planning periods. A planning period is a period when the system supplies a specific required output. The system generates an operation plan including multiple planning periods to meet the required output (overall output) defined for each time in the demand data.

The unit information database 56 stores unit information. Examples of unit information are; the registration status of each operation unit, the registration status of each planning unit, specification such as the output of the each operation unit, the failure state of each planning unit, restrictions for each operation unit, the failure state of each operation unit, the operation cost of each operation unit or the like. For electric power systems, the unit information includes, the maximum power generated from each operation unit, the minimum power generated from each operation unit, the rate of change for generated power (ramp up rate, ramp down rate), minimum operating time, minimum downtime, cost functions for generating power, the parameters of the cost functions, cold start-up costs, hot start-up costs, shut-down costs or the like.

A unit-group is a group that includes one or more pairs of operation units and planning units. For example, a unit-group that includes operation unit #1, operation unit #2 and operation unit #3 also includes planning unit #1, planning unit #2 and planning unit #3. Here, operation unit #1 is paired with planning unit #1. Operation unit #2 is paired with planning unit #2. Operation unit #3 is paired with planning unit #3. A supplying plan is the overall output of the system for each planning period.

The planning information database 57 stores information of the unit-group for each planning period and the supplying plans for each planning period.

Changes to the unit-groups are performed in units of pairs, in principle. If a new operation unit is added to a unit-group, a planning unit that is paired with the operation unit is also added to the unit-group. For example, if operation unit #4 is added to the unit-group, planning unit #4 is also added to the unit-group. This rule also applies when operation, units are deleted from the unit-group. For example, if operation unit #2 is deleted from the unit-group, the planning unit #2 which is paired is also deleted from the unit-group.

In FIG. 2, the demand information database 55, the unit information database 56, the planning information database 57 are all allocated within the management server 50. However, the location of the databases are not limited to a specific location. For example, some databases may be located in external servers or external storage devices.

The database can be implemented with relational database management systems or various NoSQL systems. Any other system can be used. The database can be centrally managed as in management server 50 of FIG. 2. However, distributed ledger technology (blockchains) can be used. In this case, the planning information database 57 is not located in the management server 50. Instead, multiple planning units 10 (namely, the storage 16) are connected with a P2P network. The format of saved data for the database can be XML, JSON, CSV, binary or any other type of format. The database system and data saving formats do not need to be unified. Different database systems and saving formats may coexist.

The required output changing unit 51 writes the updated demand data to the demand information database 55, if the output required to the system changes. Also, the required output changing unit 51 sends (broadcasts) the updated demand data to all the planning units. For electric power systems, if a greater amount of electricity needs to be supplied to meet the increased usage of cooling or heating systems, the demand data should be updated. Also, in cases when the actual usage of electricity is diverging from anticipated values, the demand data shall be updated.

The unit adding-deleting unit 52 updates the unit data in the unit information database 56 if new units are added to the system or when failures of units are detected. The unit adding-deleting unit 52 also sends (broadcasts) the updated unit data to all the units in the system.

The planning unit 10 (planning unit #1) includes a unit-group generator 11, a unit-group selector 12, a unit selector 13, a plan generator 14, a communication unit 15, a storage 16 and an operation controller 17. The unit-group generator 11, the unit-group selector 12, the unit selector 13, the plan generator 14 are components related to the generation of operation plan. Other planning units such as the planning unit 10*a* (planning unit #2) have similar features and components like the planning unit 10.

The unit-group generator 11 generates unit-groups that fulfill the required output (overall output) for each planning period by referring to the unit data and the demand data. The unit-group generator 11 creates a plurality of unit-groups for each planning period. The unit-group which is used in the actual operation is selected from the plurality of unit-groups. Below, the unit-groups prior to the selection are called the unit-group candidates. For electric power systems, the unit-group (unit-group candidate) is the combination of electric power stations (electric power generators) that operate during each planning period.

The unit-group selector 12 selects one unit-group that is used for the actual operation from a plurality of unit-group candidates, for each planning period. The selection should be done so that restrictions (constraint conditions) are met. Restrictions include the cost required for the operation and shut-down, the minimum operating time, the minimum downtime or the like. Thus, the selection of a unit-group for a specific planning period may depend on the unit-groups for the previous planning period and the next planning period.

The unit selector 13 determines the leader unit during the generation of operation plan. If a planning unit is granted the authority to create a supplying plan, the unit selector 13 instructs the plan generator 14 to create (or update) the supplying plan. The unit selector 13 also selects a planning unit to grant the authority to edit a supplying plan in the next turn, for each planning period. The supplying plan is a part of the operation plan. The supplying plan includes information on the output setting for each operation unit within a unit-group for a specific planning period. Details on the supplying plan are described later.

The plan generator 14 generates the default supplying plan and updates the supplying plan when instructions are sent from the unit selector 13. The plan generator 14 saves the updated supplying plan in the storage 16. The plan generator 14 can also send the updated supplying plan to other planning units through the communicator 15.

The communicator 15 is connected to the network 30 and has features for transmitting or receiving data. The communicator 15 enables communication of data between the planning units and communication of data between each planning unit and the management server 50. The communicator 15 can also detect failures of other planning units based on the fact whether there are responses from the planning unit located in the destination of data. It is also possible to detect failures based on the contents of the response received from the planning unit located in the destination of data. Details on the data sent and received in the communicator 15 are described later.

The storage 16 stores various data including the operation condition data for the operation units in the unit-group and the supplying plan. Working data for each stage in the generation of the operation plan can be also saved in the storage 16. The working data includes data saved during or after the unit-group generation processes, the unit-group selection processes, updates of the supplying plans. The storage 16 can be volatile memory such as SRAM, DRAM or the like. The storage 16 can also be nonvolatile memory NAND, MRAM, FRAM or the like. It is also possible to use storage devices such as HDD, SSD or the like.

The operation controller 17 controls the operation unit that is paired based on the supplying plan stored in the storage 16. The operation controller 17 can perform start-up operations, shut-down operations, changes of output settings, configuration changes or the like. The operation controller 17 can also detect additions, deletes, failures, status changes, or the like of operation units. If additions, deletes, failures, status changes, or the like are detected for operation units, the operation controller 17 notifies the changes to the management server 50. The management server 50 then saves the notified changes to the unit information database 56.

The interfaces and communication standards used by the operation controller 17 to control the operation unit 100 is not limited. For example, the operation controller 17 can communicate electric signals via PCI Express, USB, SPI, SDIO, serial ports, Ethernet or the like and control the operation unit 100. It is also possible to use various wireless communication standards to control the operation unit 100.

Each component of the planning unit 10 and the management server 50 can be implemented with software (programs) running on the CPU (Central Processing Unit). It is also possible to implement the components with hardware circuitry such as FPGAs, ASICs or the like. The components can be implemented using a combination of software and hardware circuitry.

The operation plan includes three elements; the demand data, information on unit-groups operating in each planning period and the supplying plan which is the output setting for each operation unit of the respective unit-groups. The operation plan generation process also includes three elements. These elements are; preparing demand data, generation and selection of unit-groups and generation of the supplying plan. In the following, the generation process of the operation plan by the operation planning system is described.

Figure 4:
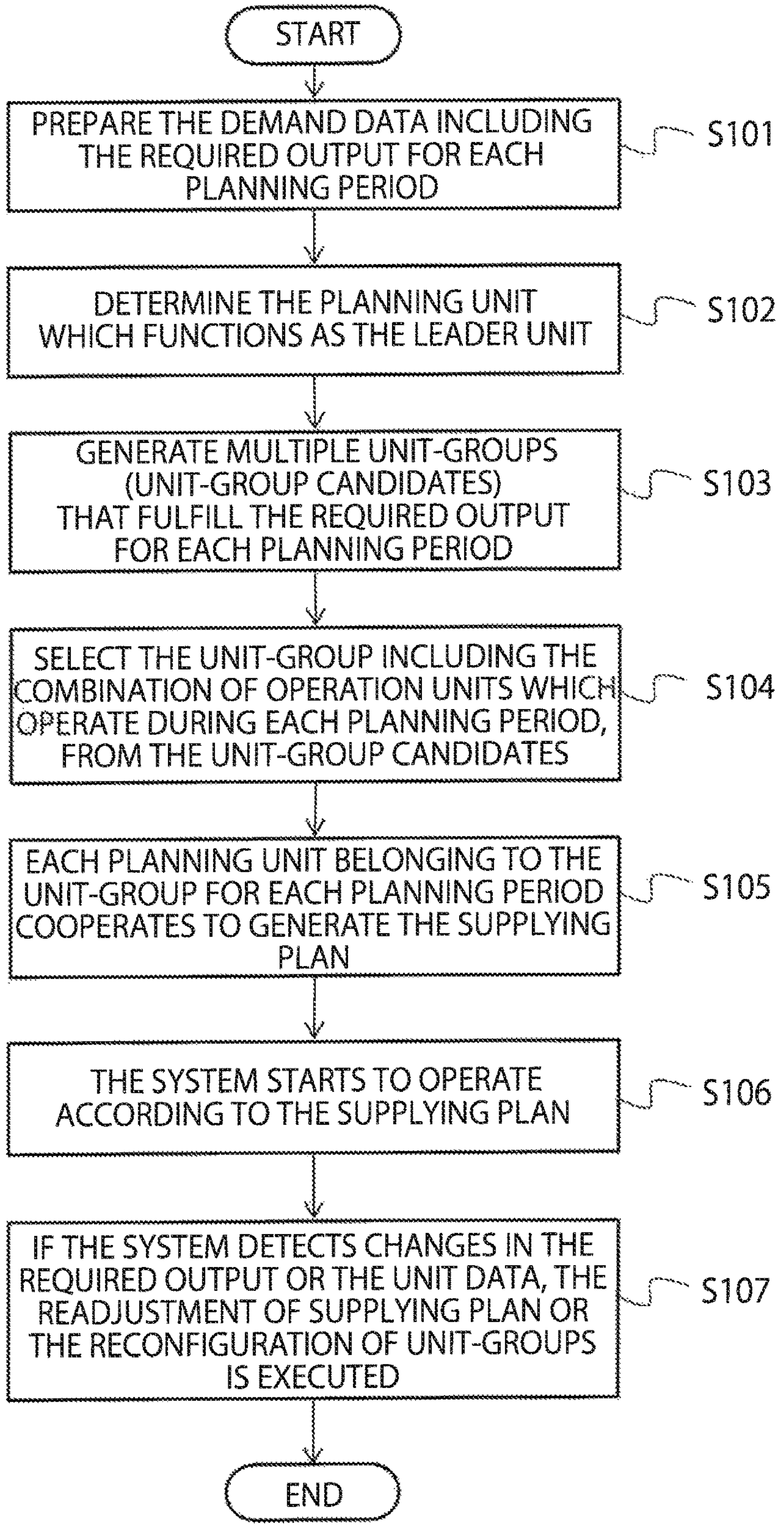
FIG. 4 is a flowchart showing the overall process of the operation planning system according to the first embodiment.

FIG. 4 is a flowchart of the showing the overall process of the operation planning system according to the first embodiment. The overall process of generating the operation plan will be described with reference to FIG. 4.

First, the operation planning system prepares the demand data which includes the required output (overall output) for each planning period. (Step S101) FIG. 3 is an example of demand data. The operation planning system generates an operation plan based on the demand data. The demand data can be generated in the operation planning system. The demand data could be also generated in another system. In such case, the operation planning system obtains the demand data from another system. The demand data is stored in the demand information database 55 of the management server 50.

Figure 5:
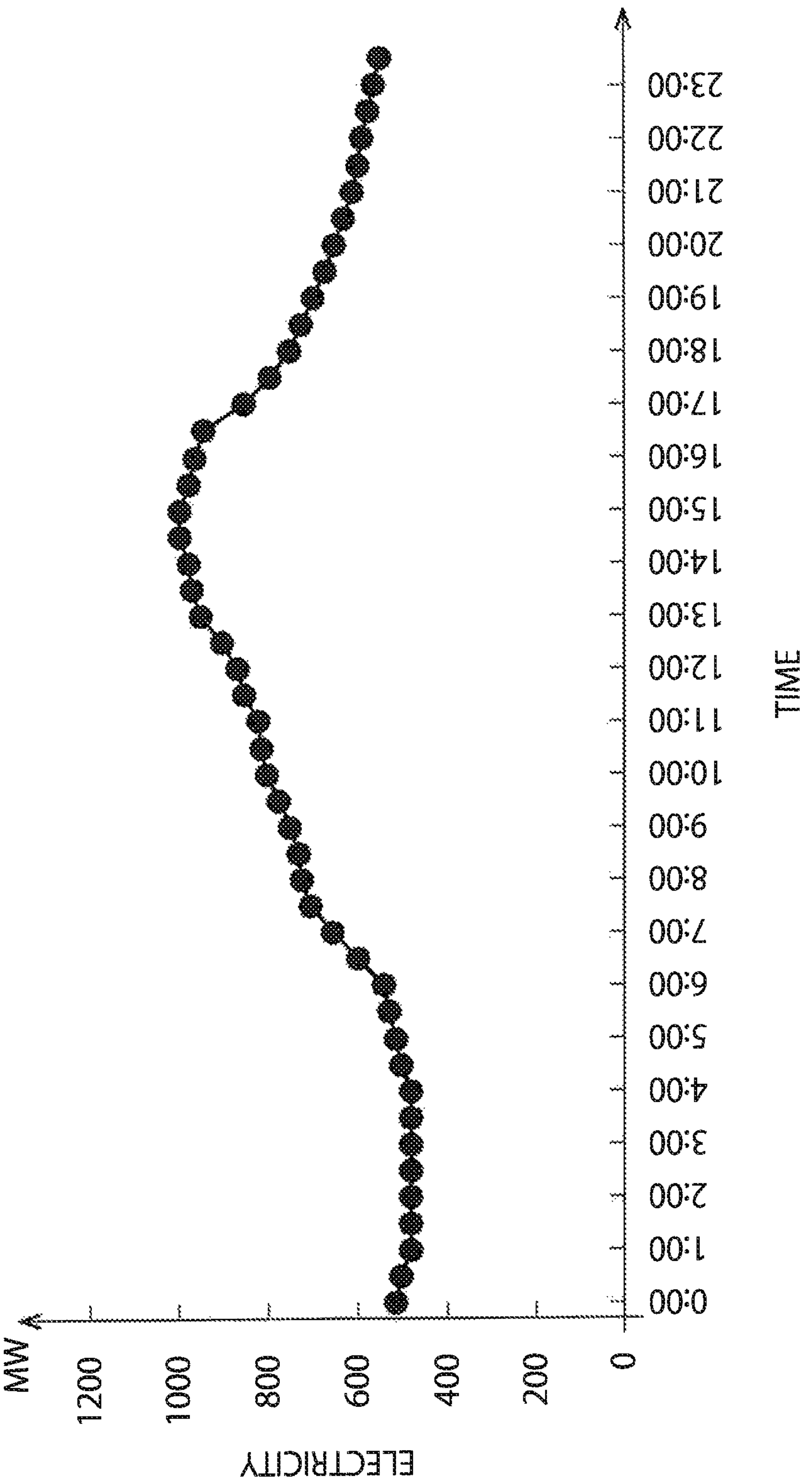
FIG. 5 is a diagram showing an example of electricity demand data for a single day.

For electric power systems, the demand data can be generated from power demand data. FIG. 5 is an example of the power demand data for a single day. The vertical axis of the graph in FIG. 5 represents electric power in units of MWs. The horizontal axis of the graph represents the time. Actual values from the past can be used as the power demand data. The power demand data can also be anticipated values. By converting the power demand data to a step-formed graph, it is possible to obtain the demand data shown in FIG. 3. The length of demand data can be 24 hours, 48 hours or any other length.

For example, the demand data can be generated by dividing the power demand data into multiple periods, setting the maximum demand for each period as the required output (overall output). Each period can have equal lengths. The duration of each period may be different. Each period becomes the planning period for demand data. Conversion to demand data is executed so that there is sufficient generation reserve margin for each time. The generation reserve margin is the margin compared to the anticipated power demand. The generation reserve margin can be set to values around 5%-8% of the maximum anticipated power demand.

The demand data is divided into multiple planning periods. For each planning period, the required output takes a constant value. In the example shown in FIG. 3, the demand data includes planning period p1 with required output D1, planning period p2 with required output D2, planning period p3 with required output D3, planning period p4 with required output D4 and planning period p5 with required output D5. The times t2, t3, t4 and t5 correspond to the timing when the planning periods are switched.

Next, the operation planning system determines the planning unit which functions as the leader unit. (Step S102) The leader unit is the planning unit that generates the unit-group candidates and selects the unit-group which is actually going to be used in the operation. The leader unit could be selected by using different methods.

For example, the output of the operation unit divided by the cost for operation can be used as the priority value. In this case, the planning unit with the highest priority value within a unit-group can be selected as the leader unit. It is also possible to configure the planning unit that becomes the leader unit in the unit information database 56, in advance. Also, it is possible to select the planning unit which finished launching first as the leader unit. By applying an equation to the unit data stored in the unit information database 56, it is possible to get an output value. The planning unit with the highest output value can be selected as the leader unit. Any other method can be used to determine the leader unit.

Figure 6:
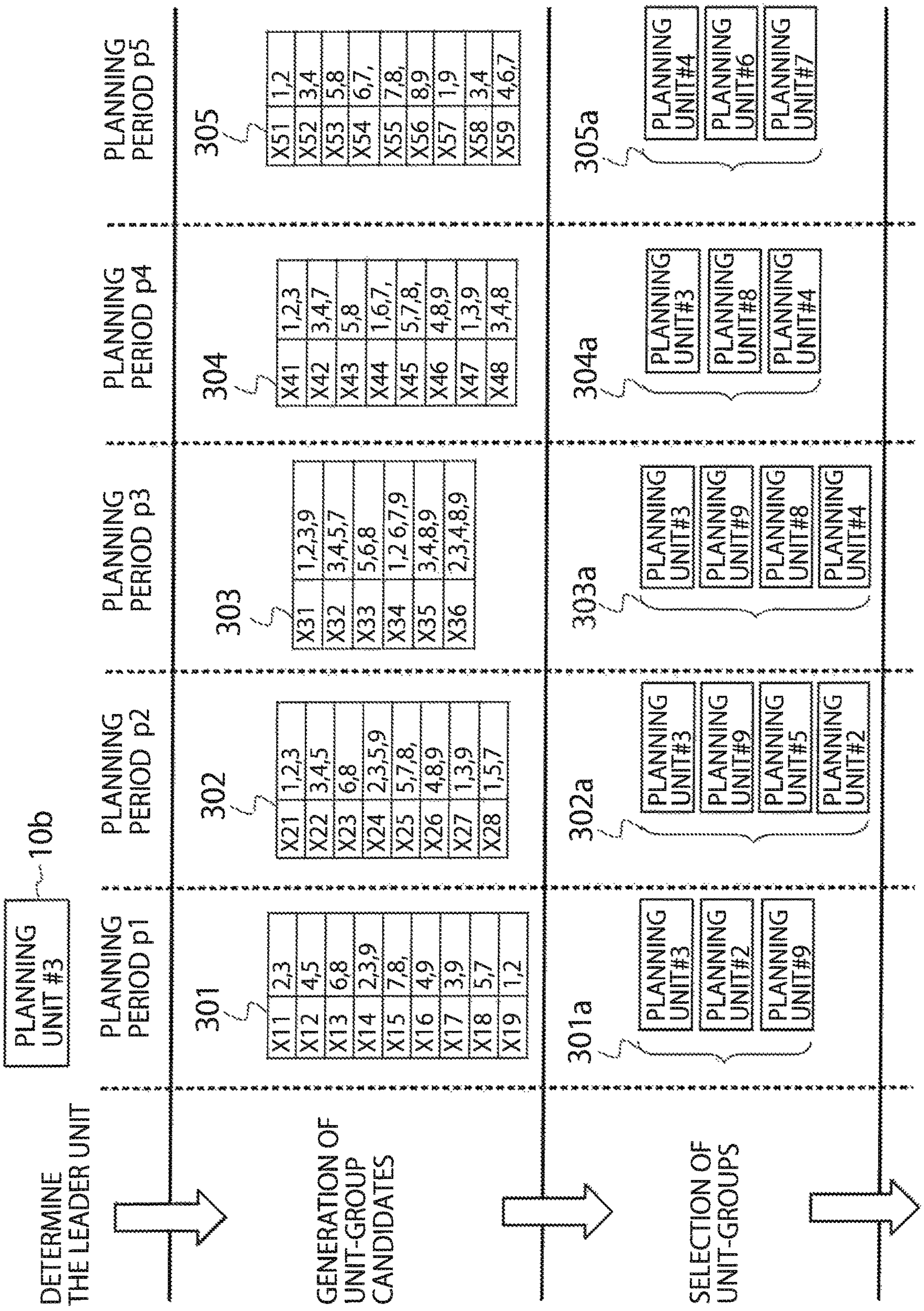
FIG. 6 is a diagram showing a unit-group and examples of selections during the generation of an operation plan.

FIG. 6 is a diagram showing a unit-group and examples of selections during the generation of operation plan. In the example shown in FIG. 6, the planning unit 10*b* (planning unit #3) is the leader unit.

Next, the leader unit generates multiple unit-groups (unit-group candidates) that fulfill the required output for each planning period. (Step S103)

Unit-group candidates are generated by the unit-group generator 11. The unit-group generator 11 obtains the unit data from the unit information database 56. The unit-group generator 11 obtains the demand data from the demand information database 55. The unit-group generator 11 refers to the number of units in the unit data, output of units in the unit data and the required output for each time in the demand data to generate multiple unit-group candidates. The data pertaining to the generated unit-group candidates is stored in the storage 16.

In the middle of FIG. 6, tables storing unit-group candidates are shown. In this case, a table 301 with unit-group candidates for planning period p1, a table 302 with unit-group candidates for planning period p2, a table 303 with unit-group candidates for planning period p3, a table 304 with unit-group candidates for planning period p4 and a table 305 with unit-group candidates for planning period p5 are generated.

In the right side column of table 301, identifiers for unit-group candidates are stored. The identifiers X11-X19 correspond to different unit-group candidates, respectively. Referring to table 301, 9 unit-group candidates, X11-X19 are generated. Similarly, in table 302, 8 unit-group candidates X21-X28 are stored. In table 303, 6 unit-group candidates X31-X36 are stored. In table 304, 8 unit-group candidates X41-X48 are stored. In table 305, 9 unit-group candidates X51-X59 are stored. The aforementioned identifiers for unit-group candidates are only examples. Identifiers of different forms could be used.

In the left side column of table 301, identifiers for the pairs of operation units and planning units are stored. For example, in the row corresponding to unit-group candidate X11, identifiers "2" and "3" are saved. Here, the identifier "2" represents the pair including the operation unit #2 and the planning unit #2. The identifier "3" represents the pair including the operation unit #3 and the planning unit #3. Thus, unit-group candidate X11 includes operation unit #2, operation unit #3, planning unit #2 and planning unit #3. The aforementioned identifiers for the pairs are only examples. Identifiers in different forms can be used.

Other tables can be interpreted similarly. For example, unit-group candidate X31 which is stored in table 303 includes operation unit #1, operation unit #2, operation unit #3, operation unit #9, planning unit #1, planning unit #2, planning unit #3 and planning unit #9.

Figure 7:
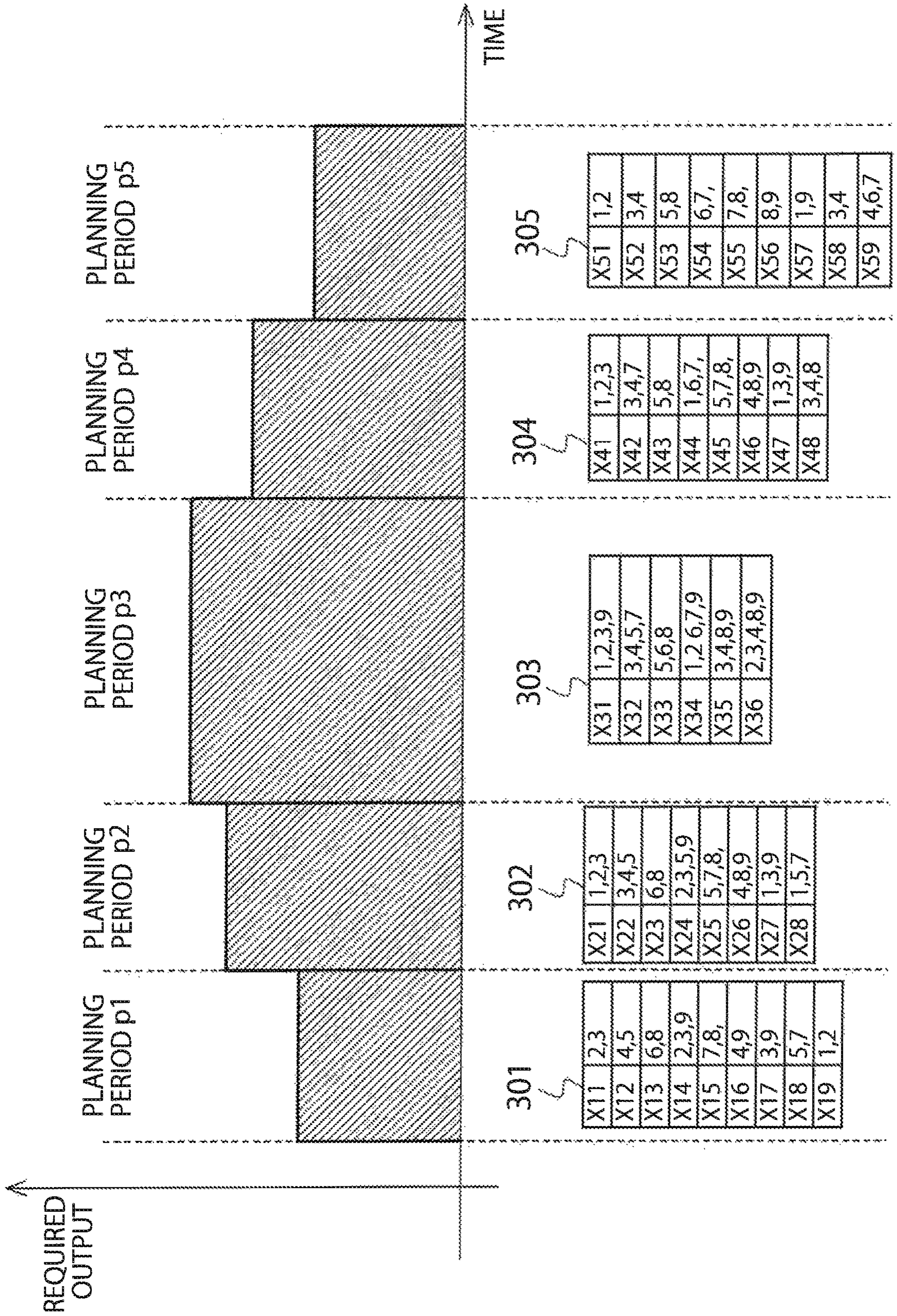
FIG. 7 is a diagram showing the relationship between the generated unit-group and the required output.

FIG. 7 shows the relationship between the generated unit-groups and the required output (overall output). From FIG. 7, it can be inferred that the unit-group candidates for each planning period are combinations of unit-groups which can fulfill the required output defined in the demand data. In planning period p1 and p5 when the value of required output is relatively Small, the unit-group candidates include approximately 2.1 operation units in average. However, for planning period p3 with the greatest required output, the unit-group candidates include an average of approximately 4.2 operation units.

The leader unit selects the unit-group which includes the combination of operation units which actually operate during each planning period, from the unit-group candidates. (Step S104) Below, this process is referred as the selection of unit-groups. The selection of unit-groups for each planning period needs to satisfy restrictions. Examples of restrictions include the minimum uptime, the minimum downtime or the like for operation units. If the minimum uptime or the minimum downtime is defined, operation units that can be stopped, operation units that cannot be stopped, operation units that can be launched and operation units that cannot be launched exist in the timings between the planning periods.

Other conditions may exist for the operation units. For operation units with output values depending on the weather, such as solar power stations and wind power stations, the chance for starting up may depend on the weather conditions. Pumped-storage hydroelectric power stations require that certain volume of water is pumped up using surplus power. In this case, other operation units need to be operating for a certain period of time before the operation unit is launched.

Since restrictions exist, the selection of unit-groups is equivalent to combinatorial optimization problems. As mentioned later, it is possible to select combination of unit-group which satisfies the restrictions by using genetic algorithms, reinforcement learning, greedy algorithms or the like. By using these algorithms, it is possible to accelerate the searching process.

The selection of unit-groups is executed by the unit selector 13. The unit selector 13 obtains the unit-group candidate data generated by the unit-group generator 11, from the storage 16. The unit selector 13 selects one unit-group for each planning period, from multiple unit-group candidates. The unit-selector 13 sends the data of selected unit-groups to the management server 50. The management server 50 saves the data corresponding to the selected unit-groups in the planning information database 57.

In the bottom of FIG. 6, the unit-groups selected for each planning period is illustrated. For planning period p1, a unit-group 301*a* including planning unit #2, planning unit #3 and planning unit #9 is shown. Thus, it can be inferred that for planning period p1, unit-group candidate X1 including planning unit #2, planning unit #3 and planning unit #9 has been selected as the unit-group.

For planning period p2, unit-group 302*a* including planning unit #2, planning unit #3, planning unit #5 and planning unit #9 is shown. Thus, it can be inferred that for planning period p2, unit-group candidate X24 including planning unit #2, planning unit #3, planning unit #5 and planning unit #9 has been selected as the unit-group.

From the similar relationships, selections for other planning units can be inferred. For planning period p3, unit-group candidate X35 is selected as the unit-group. For planning period p4, unit-group candidate X48 is selected as the unit-group. For planning period p5, the unit-group candidate X59 is selected as the unit-group.

The planning units belonging to the unit-group selected for each planning period generates the supplying plan. The operation units belonging to the unit-group selected for each planning period operates according to the supplying plan.

Next, each planning unit belonging to the unit-group for each planning period cooperates to generate the supplying plan. (Step S105)

The processes for generating and updating the supplying plan are executed by the plan generator 14. Each planning unit belonging to a unit-group obtains the operation condition data for all the operation units within the unit-group, from the management server 50. The operation condition data is data used for controlling operation units. The operation condition data is a subset of the unit data. For electric power systems, the operation condition data includes the maximum generated power, the minimum generated power, the maximum uptime, the minimum uptime, various cost indexes, generating capacity rate of change or the like. The operation condition data is saved in the storage 16.

The plan generator 14 generates and updates the supplying plan based on the operation condition data for all the operation units within a unit-group. The plan generator 14 can only generate or update the supplying plan when the planning unit has the authority to edit the supplying plan. The unit selector 13 notifies the plan generator 14 whether the planning unit has the authority to edit the supplying plan or not.

If the supplying plan is generated by the plan generator 14, the unit selector determines the planning unit to grant the authority to edit the supplying plan in the next turn. The plan generator 14 sends the updated supplying plan to the planning unit granted with the authority to edit the supplying plan in the next turn. The plan generator 14 of the planning unit which received the supplying plan updates the supplying plan. The unit selector 13 can notify other units that the authority to edit the supplying plan is granted. Also, a planning unit may determine that it is granted the authority to edit the supplying plan when it receives a supplying plan from other units. The plan generator 14 for each planning unit continues the update of the supplying plan until the generation supplying plan is completed.

Figure 8:
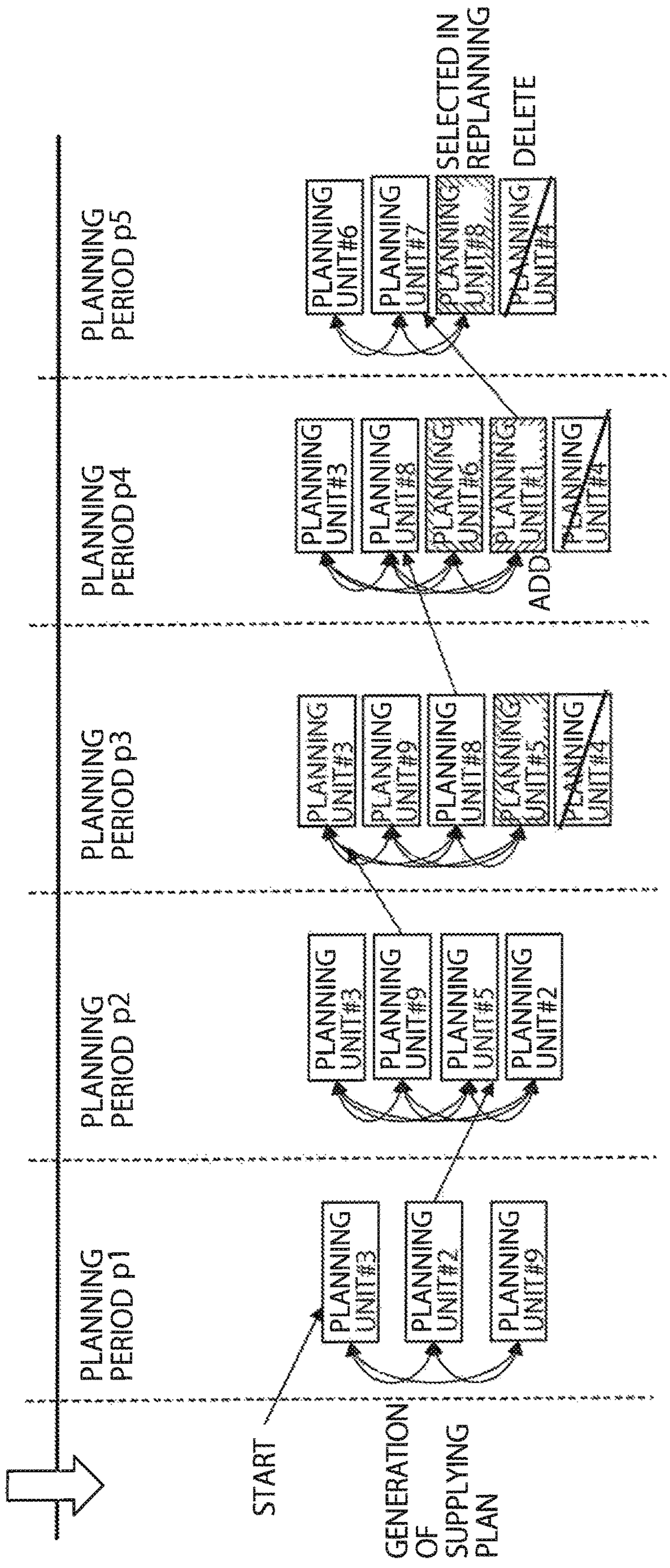
FIG. 8 is a diagram showing the process to generate a supplying plan.

FIG. 8 illustrates an example of the supplying plan generation process. The process shown in FIG. 8 is the continuation of the process shown in FIG. 6. Below, the supplying plan generation process is explained in reference to FIG. 8.

In the example of FIG. 8, the planning unit #3 which is the leader unit generates the supplying plan for planning period p1. The supplying plan generated in this initial stage is incomplete. The total output of this supplying plan does not always match the value of required output (overall output) for planning-period p1 in the demand data. Therefore, each planning unit belonging to unit-group X14 adjusts the supplying plan in alternating shifts, until the total output of the operation units is equal to the required output.

The planning unit #3 selects planning unit #2 as the planning unit which adjusts the supplying plan in the next turn. The planning unit #3 sends the adjusted supplying plan to the planning unit #2. The authority to edit the supplying plan is granted to the planning unit #2, from the planning unit #3. After the planning unit #2 adjusts the supplying plan, it specifies planning unit #9 as the planning unit which adjusts the supplying plan in the next turn. The planning unit #2 sends the adjusted supplying plan to the planning unit #9.

This alternating adjustment of the supplying plan is repeated until the output of the supplying plan is equal to the required output. If the output of the supplying plan is equal to the required output, the planning unit with the authority to edit the supplying plan selects a planning unit belonging to the unit-group for to the planning period the supplying plan is going to be prepared next.

For the example in FIG. 8, the overall output of the supplying plan became equal to the required output when the planning unit #2 had the authority to edit the supplying plan. The planning unit #2 selects the planning unit #5 from the unit-group X24, which is the unit-group for planning period p2. The planning period p2 is the planning period the supplying plan is going to be prepared next. Therefore, the authority to edit the supplying plan is granted to planning unit #5. Then, the planning unit #5 generates the default supplying plan for planning period p2.

The generation of supplying plan for planning periods beyond the planning period p2 is similar to the process described above. In the example illustrated in FIG. 8, the supplying plans are generated in the order of; supplying plan p1, p2, p3, p4 and p5. However, the supplying plan can be generate in a different order. For example, the supplying plan for the planning period with the greatest required output can be generated first. If this rule is applied, the supplying plans will be generated in the order of; supplying plan p3, p2, p4, p1 and p5 for the example shown in FIG. 8.

If changes in system configuration are detected during the generation of supplying plan, the supplying plan may be readjusted. Addition of pairs including planning units and operation units, failures of planning units or operation units are examples of the changes in system configuration. Failures of planning units and operation units may be detected by the management server 50. Detection of failures can be done by the planning unit as well. Methods of failure detection include the use of heartbeat signals, but other methods could be used as well.

The pairs of planning units and operation units can be added dynamically. In the example of FIG. 8, planning unit #1 is added to the unit-group for planning period p4, considering the time required to start the operation unit #1. The management server 50 can notify all the planning units that a pair including operation unit #1 and planning unit #1 is added to the system. When this notification is complete, each planning unit which generates the supplying plan can add the planning unit #1 and the operation unit #1 to the unit-groups.

For the example shown in FIG. 8, failure of planning unit #4 is detected during the generation of supplying plan for planning period p2. During the detection of failure, the authority to edit the supplying plan was granted to planning unit #2. In this case, the planning unit #2 deletes the failed planning unit #4 from the unit-groups corresponding to each planning period. Specifically, planning unit #4 and operation unit #4 are deleted from unit-group X35 for planning period p3, unit-group X48 for planning period p4 and unit-group X59 for planning period p5. Similar processes would be executed if failure of the operation unit #4 is detected.

If the failed planning unit #4 is deleted, the planning unit #2 makes minimum changes to the operation plan, so that the adjustment of supplying plan can be continued. In the example shown in FIG. 8, the planning unit #5 and the operation unit #5 are added to the unit-group for planning period p3. For the unit-group of the planning period p4, the planning unit #6 and the operation unit #6 are added. For the unit-group of the planning period p5, the planning unit #8 and the operation unit #8 are added. The processes for generating the supplying plan for planning periods p3, p4 and p5 are executed by the updated unit-groups. Thus, it is possible to add and delete planning units during the generation of supplying plan.

Generation of supplying plans for each planning period is executed so that the plans satisfy the restrictions. In addition to the restrictions, metrics such as the costs can be used to generate and adjust the supplying plans.

If the generation of supplying plans is complete for all the planning periods, the system starts to operate according to the supplying plan. (Step S106) For electric power systems, the supply of electricity from multiple power stations (power generators) start in this stage.

It is expected that electric power with no deficiencies or excess compared to the power demand is supplied with a sufficient generation reserve margin; if each electric power station is operating according to the supplying plan generated from the demand data. However, there are cases when electricity from power stations included in the supplying plan cannot be provided due to failures of generators or power lines. Also, when there are abrupt fluctuations in temperature, the usage rate of air conditioning systems may rise, increasing the power demand. In such cases, the supply of electricity may become insufficient.

By using the embodiment according to this invention, it is possible to regenerate the operation plan without stopping the system when there are failures of operation units or drastic changes in power demand after the start-up of system. The system confirms the value of required output and unit data during operation. If the system detects changes in the required output or the unit data, the readjustment of supplying plan or the reconfiguration of unit-groups is executed. (Step S107) The reconfiguration of unit-groups includes, adding pairs of operation units and planning units, deleting pairs of operation units and planning units or a combination of these.

If the system can accommodate the changes with readjustment of the supplying plan, the output of each operation unit in the unit-group is adjusted. If the degree of change is too large that it cannot be handled only with the readjustment of the supplying plan, the reconfiguration of unit-groups is executed before the readjustment of the supplying plan. Details of this process are mentioned later.

By using the method described in the embodiment according to this invention, it is possible to handle configuration changes and fluctuations of power demand during the generation of operation plan or the operation of the system. Compared to cases when the process of generating the operation plan is concentrated in a central management server, the plan can be prepared in a shorter period of time. Also, the scalability of system can be improved.

Below, more detailed explanation is given on the operation planning process. First, the generation of unit-group candidates, which is the first process the leader unit executes for the operation planning process is explained.

Figure 9:
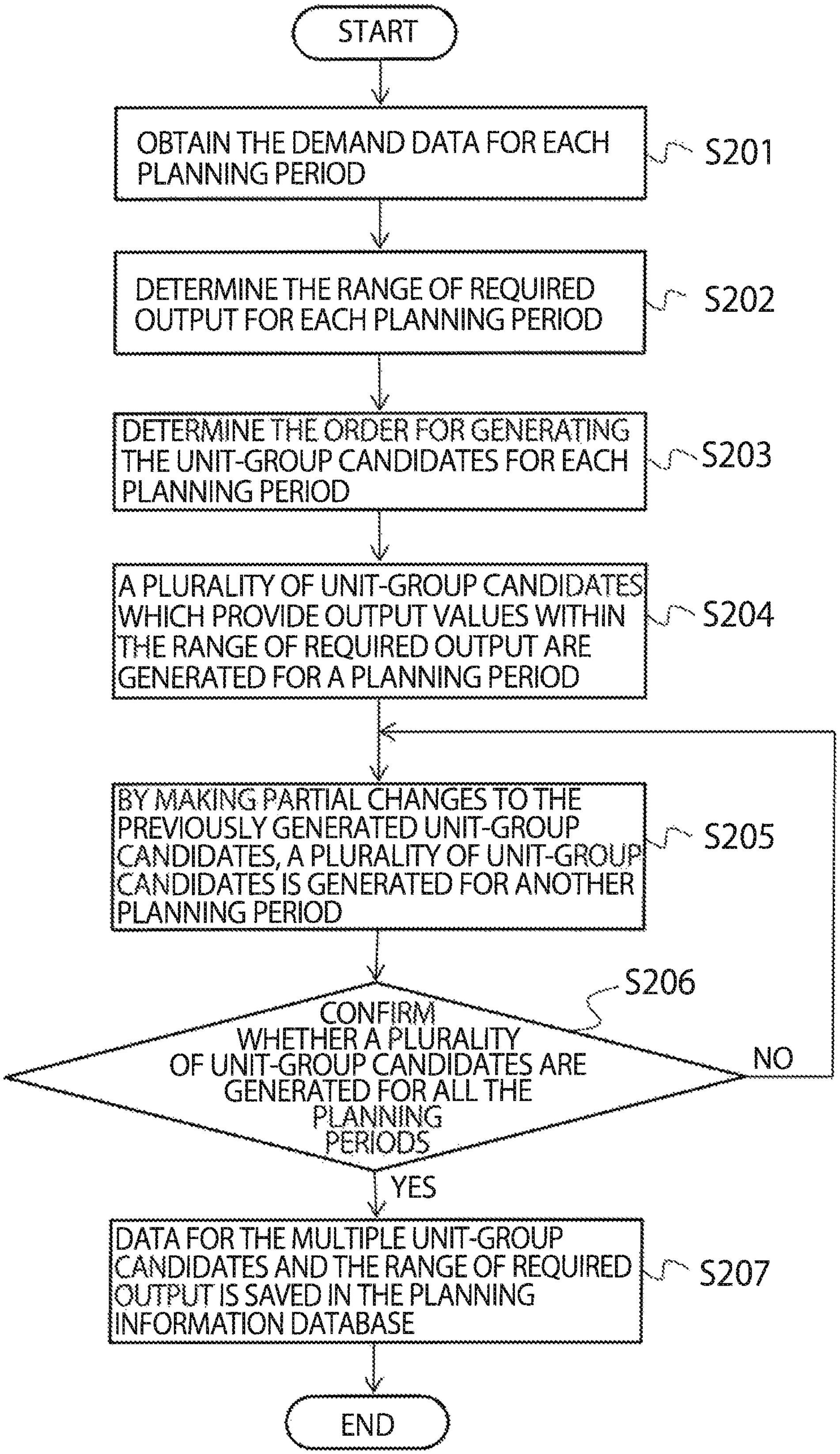
FIG. 9 is a flowchart showing the generation of unit-group candidates.

FIG. 9 is a flowchart showing the generation of unit-group candidates. During the generation of unit-group candidates, multiple unit-group candidates are generated for each planning period. Below, the process is explained in reference to FIG. 9.

The leader unit obtains the demand data for each planning period. (Step S201) The demand data is the data including the value of output required for each planning period (required output).

Next, the leader unit determines the range of required output for each planning period. (Step S202) If the required output for a planning period defined in the demand data is D, the range of required output is [α*D, β*D]. Here, the coefficient α is a number equal to or smaller than 1. The coefficient β is a number greater than 1. The coefficient α can be set to values such as 1.0 or 1.1, for example. The coefficient β can be set to values such as 1.2 or 1.3, for example. However, different values can be used for the coefficients α and β. If the power demand changes during the generation of operation plan or the operation of the system, the range of required output can be used to determine whether the reconfiguration of unit-groups should be executed or not.

For example, if the fluctuation of power demand is within the range of required output, the reconfiguration of unit-groups is not executed. Instead the readjustment of supplying plan is executed with the current unit-group. The reconfiguration of unit-groups is executed in cases when the fluctuation of power demand exceeds the range of required output. Thereby, the workload needed when fluctuations of power demand occurs is reduced. Also, operating costs between the planning periods can be lowered by decreasing the frequency of operation unit start-ups and shut-downs.

Next, the order for generating the unit-group candidates for each planning period is determined. (Step S203) Unit-group candidates can be generated according to the chronological order of planning periods. If all the operation units in the system need to be operating during the planning period with the greatest required output, the unit-group candidates for the planning period with the larger required outputs could be determined first. The order for generating the unit-group candidates can be determined using other methods.

Then, a plurality of unit-group candidates are generated for a planning period. These unit-group candidates provide output values within the range of required output. (Step S204)

Next, the planning period the unit-group candidate is going to be generated in the next turn is selected. One way to select the planning period the unit-group candidate is going to be generated in the next turn is, by finding the planning period with the closest required output value. However, other methods can be used for the selection. For example, the planning period chronologically before or after the previously selected planning period can be selected. By making partial changes to the previously generated unit-group candidates, a plurality of unit-group candidates is generated for another planning period. (Step S205)

If the required output for the selected planning period is greater than the previously selected planning period, new unit-group candidates can be generated by adding pairs of operation units and planning units to the previously generated unit-group candidates. If the required output for the selected planning period is smaller than the previously selected planning period, new unit-group candidates can be generated by deleting pairs of operation units and planning units from the previously generated unit-group candidates. If the difference of the required output for planning periods is small, the unit-group candidates generated for the previously selected planning period can be used again.

In the next step S206, it is confirmed whether a plurality of unit-group candidates are generated for all the planning periods. If a plurality of unit-group candidates is generated for all the planning periods, data for the multiple unit-group candidates and the range of required output is saved in the planning information database 57. (Step S207) If the generation of a plurality of unit-group candidates is not complete for all the planning periods, step S205 is executed again.

After step S207, the unit-group generation process is completed. By executing the unit-group selection process, the unit-groups that are actually going to be used is selected from the unit-group candidates.

Next, the selection of unit-groups is described. In the selection of unit-groups, unit-groups that satisfy the restrictions need to be selected. Thus, the selection of unit-groups is a form of combinatorial optimization problem.

Figure 10:
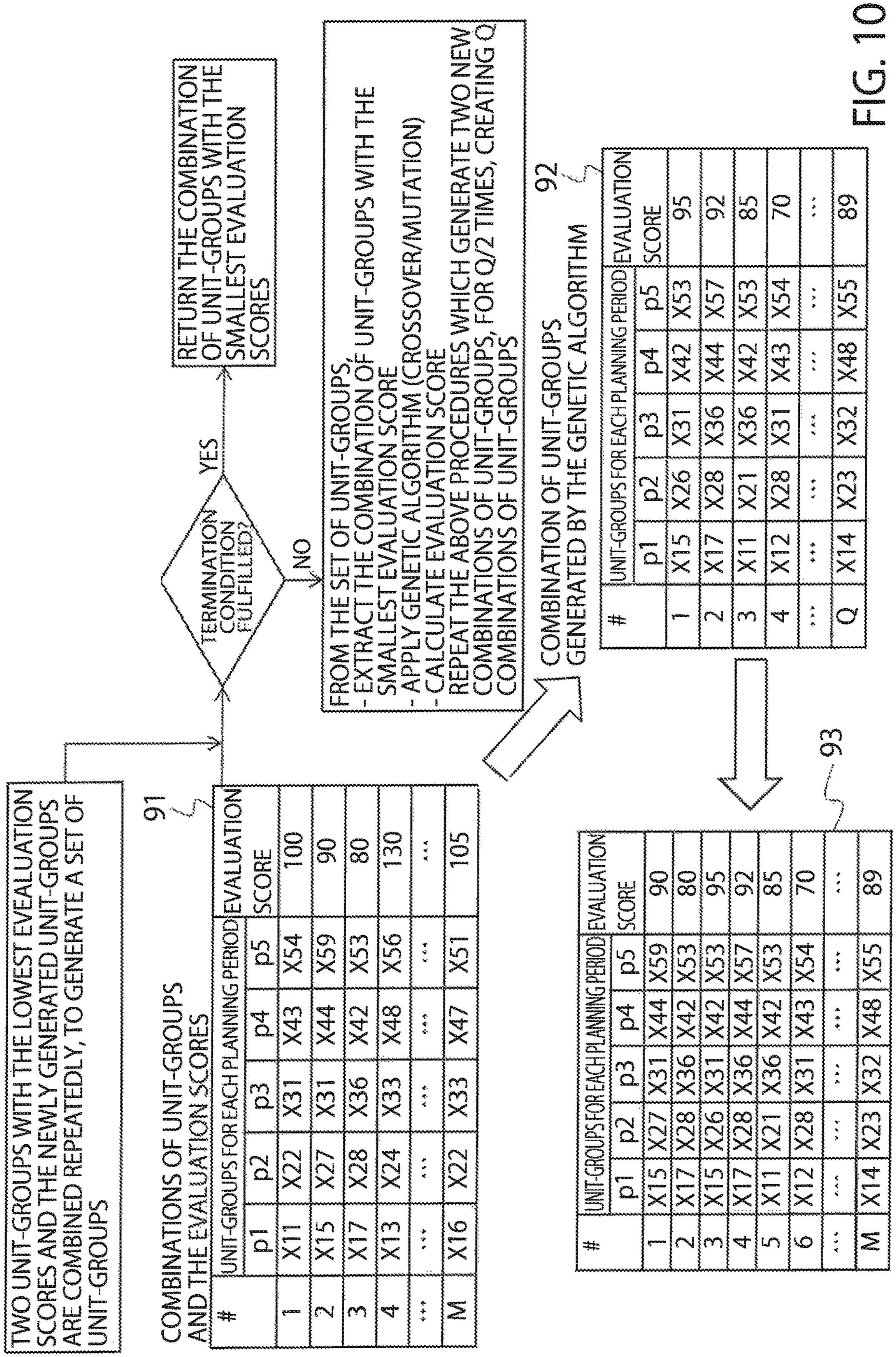
FIG. 10 is a diagram showing the selection of unit-groups with genetic algorithm.

FIG. 10 is a diagram showing selection of unit-groups by genetic algorithm.

First, a single unit-group is selected from the plurality of unit-group candidates, for each planning period. The selection of the single unit-group can be done in random. Then a combination of unit-groups with one unit-group assigned for each planning period is generated. By repeating this process M times, M combinations of unit-groups are prepared.

Next, it is confirmed whether each combination of unit-groups satisfies the restrictions. If the operation unit is an electric power station (electric power generator), the minimum uptime and the minimum downtime becomes the restrictions. Then the evaluation scores for the combination of unit-groups are calculated. If the operation unit is an electric power station (electric power generator), the evaluation score is the sum of the start-up cost (the cold start-up cost or the hot start-up cost), the shut-down cost and the power generation cost. This evaluation score is only an example. Other metrics may be used to calculate the evaluation cost. For example, various metrics for environmental load can be used.

Combination of unit-groups that do not satisfy the restrictions may be excluded from the calculation of the evaluation scores. It is also possible to multiply values such as 9999999, setting the evaluation score to high values. By executing the aforementioned processes, table 91 with a combination of M unit-groups and evaluation scores is generated in the example shown in FIG. 10.

In the selection of unit-groups by genetic algorithm, combinations of unit-groups with a relatively small evaluation score is combined to find combinations of unit-groups with smaller scores. First, from the M combinations of unit-groups which were generated initially, two combinations of unit-groups with the smallest evaluation scores are selected. By applying the crossover operation and the mutation operation of genetic algorithm to the two extracted combinations of unit-groups, two new combinations of unit-groups are generated. Evaluation scores are calculated for the two unit-groups generated by using the genetic algorithm.

For the example shown in FIG. 10, combination #2 with an evaluation score of 90 and combination #3 with an evaluation score of 80 is extracted from table 91. By applying the crossover operation and the mutation operation of genetic algorithm to the two extracted combinations of unit-groups, two new combinations of unit-groups are generated. Evaluation scores are calculated for the two unit-groups generated by using the genetic algorithm.

By executing the aforementioned operations, four combinations of unit-groups are generated. Among the four combinations, the two combinations with the smallest evaluation scores are extracted. The crossover operation and the mutation operation of genetic algorithm are applied to the two extracted combinations of unit-groups. Then, two more combinations of unit-groups are generated. Evaluation scores are calculated for the two new unit-groups generated by using the genetic algorithm.

By executing the aforementioned operations, six combinations of unit-groups are generated. In table 92 of FIG. 10, Q combinations of unit-groups are generated by repeating the same processes Q/2 times. The repeated process here is the selection of two combinations of unit-groups with the smallest evaluation score, the generation of two unit-groups by genetic algorithm and the calculation of the evaluation score.

These processes are repeated until the terminating condition is met. The processes may be terminated if combinations of unit-groups with an evaluation score equal to or smaller than the threshold are generated. Also, if the repeat count of processes exceeds the limit, the processes can be terminated.

The table 93 shown in FIG. 10 includes the M combinations of unit-groups that were generated when the aforementioned processes were completed. Combination #1 and combination #2 in table 93 were extracted from table 91 in the beginning. The remaining M−2 combinations of unit-groups are combinations of unit-groups generated by the genetic algorithm.

In the selection of unit-groups, the combination of unit-groups with the smallest evaluation score in table 93 can be selected as the unit-groups that are actually used in each planning period. Other combinations of unit-groups can be used when the unit-groups are reconfigured. For example if either the planning unit or the operation unit fails, a combination of unit-groups not including the failed planning unit or the failed operation unit can be selected as the unit-groups that are used in each planning period.

After the unit-groups that actually operate in each planning period are selected, the planning units belonging to each unit-group cooperate to generate the supplying plan. Below, the process of generating the supplying plan is described in detail. The generation of the supplying plan includes the generation of the default supplying plan executed by a specific planning unit and the adjustment of the supplying plan executed by each planning unit within a unit-group.

The process of generating the supplying plan is executed for each planning period in the operation plan. For example, if the operation plan is divided into planning periods p1, p2, p3, p4 and p5, the supplying plan for the planning period p1, the supplying plan for the planning period p2, the supplying plan for the planning period p3, the supplying plan for the planning period p4 and the supplying plan for the planning period p5 are generated, respectively. The supplying plans for each planning period are generated by the planning units belonging to the unit-group for the corresponding planning period.

The process for generating the supplying plan is executed by multiple planning units until the supplying plan for the corresponding planning period is completed. The planning unit with the authority to edit the supplying plan can execute the process for generating the supplying plan. Each planning unit passes the authority to edit the supplying plan to a different planning unit when the process for one turn is executed. Thus, the authority to edit the supplying plan is circulated across each planning unit belonging to the unit-group. The generation of the supplying plan is a process where each planning unit belonging to the unit-group adjusts the supplying plan in alternating shifts. In cases when changes in power demand or configuration of units are detected, the readjustment of supplying plans is executed.

Figure 11:
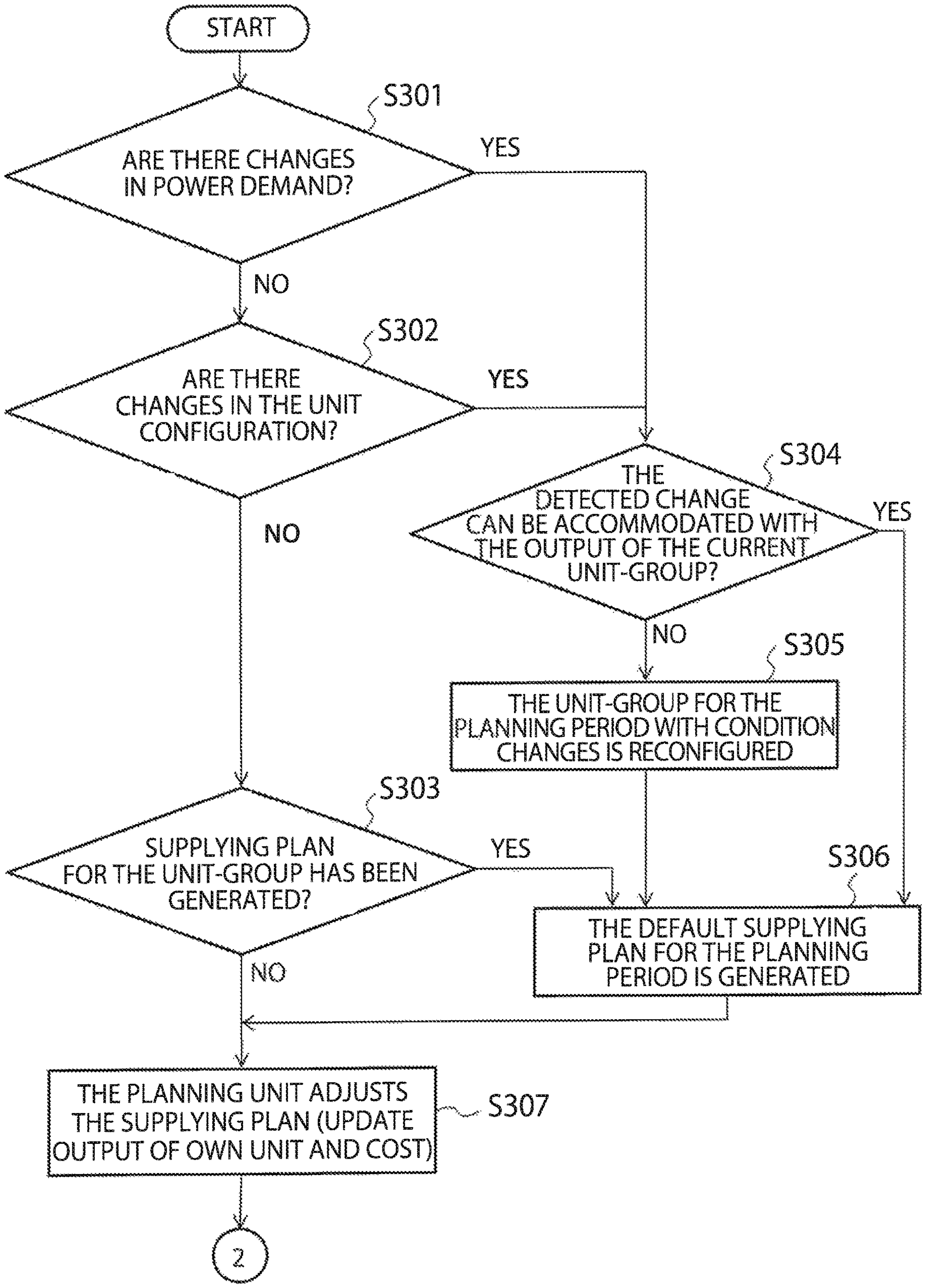
FIG. 11 is a flowchart showing the generation of a supplying plan.
Figure 12:
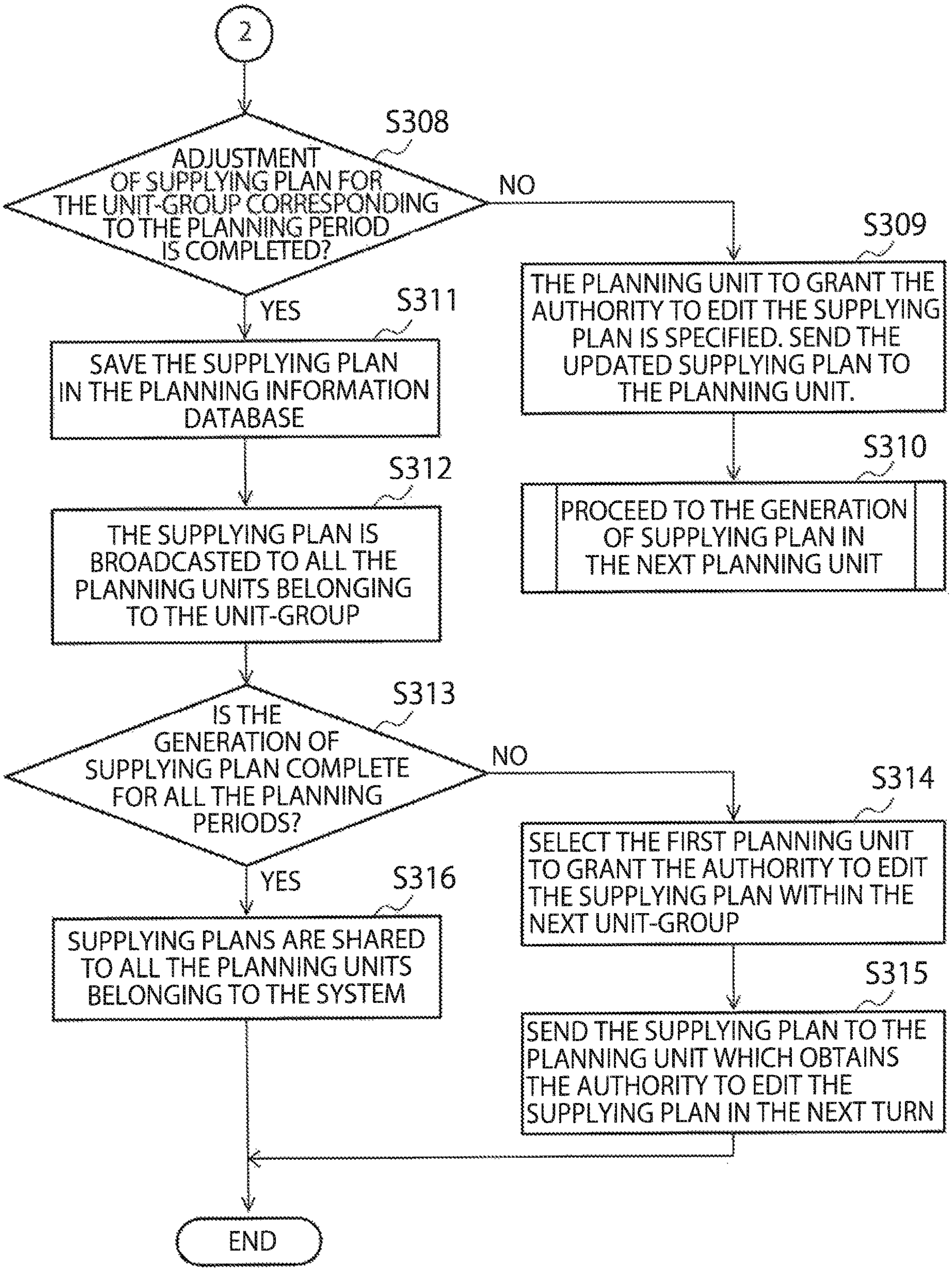
FIG. 12 is a flowchart showing the generation of a supplying plan.

FIG. 11 and FIG. 12 are flowcharts for the generation of supplying plans. In below the processes are described in reference to FIG. 11 and FIG. 12. The processes drawn in the flowcharts of FIG. 11 and FIG. 12 are executed when the plan generator 14 of the planning unit receives the instruction to generate (update) the supplying plan from the unit selector 13.

The planning unit with the authority to edit the supplying plan confirms whether there are changes in power demand or not. (Step S301) Specifically, the plan generator 14 refers to the demand information database 55 in the management server 50 to check whether there are changes in required outputs (overall outputs) for each planning period. If there are no changes in the required output, changes in the unit configuration is confirmed. (Step S302) If there are changes in the required output, the scope of change for the operation plan is confirmed. (Step S304)

The planning unit which has the authority to edit the supplying plan in step S302 confirms whether there are changes in the unit configuration. The plan generator 14 refers to the unit information database 56 in the management server 50 to check the unit data. It is determined that there are changes in unit configuration if; failures of planning units or operation units, removal of planning units or operation units, additions of pairs including planning units and operation units are detected. If there are changes in unit configuration, the scope for updating the operation plan is confirmed. (Step S304) If there are no changes in unit configuration, it is confirmed whether the supplying plan has been generated or not. (Step S303)

The planning unit that has the authority to edit the supplying plan in step S303 confirms whether the supplying plan for the unit-group has been generated. If the process of generating the supplying plan has not been executed yet for the unit-group, the default supplying plan is generated. (Step S306) If the supplying plan for the unit-group is generated, the supplying plan is adjusted. (Step S307)

In step S304, the planning unit with the authority to edit the supplying plan confirms whether the detected change can be accommodated with the output of the current unit-group. If the value of required output in the demand data increases or if planning units or operation units belonging to the unit-group failed, there is a risk that the overall output of the operable operation units within the unit-group is lower than the required output. Therefore the total output of the operable operation units should be checked.

If the detected change is so large that it cannot be handled with the output of the current unit-group, the unit-group for the planning period with condition changes is reconfigured. (Step S305) After the unit-group is reconfigured, the default supplying plan for the corresponding planning period is generated. (Step S306) If the changes can be handled with the output of the current unit-group, the default supplying plan is generated without reconfiguring the unit-group. (Step S306)

In step S306, the planning unit with the authority to edit the supplying plan generates the default supplying plans for specific planning periods. The default supplying plan is generated in cases when changes in power demands or failures of the operation units are detected. The plan generator 14 generates the default supplying plan by using the demand data obtained from the demand information database 55 and the operation condition data obtained from the unit information database 56. The generated supplying plan is saved in the storage 16. If the default supplying plan is already generated, the planning unit adjusts the supplying plan. (Step S307)

If the required output in the demand data decreased, actions to reduce the operating costs may be executed. In such cases, the unit-group can be reconfigured. Also, the operation plan may be reconfigured. If new pairs of planning units and operation units are added to the system, the pair can be added to any unit-group. For example, if the operating costs of the new operation unit is small, it is possible to swap the new operation unit with another operation unit in the unit-group. In this case, actually the pair including the planning unit and the operation unit is swapped. If the pair including the planning unit and the operation unit is swapped, the supplying plan is adjusted.

In step S307, the supplying plan is adjusted. If the operation units are electric power stations (electric power generators), the value of generated electricity and value of cost is adjusted so that the overall (total) output of the unit-group is equal to the required output. The plan generator 14 saves the adjusted supplying plan to the storage 16. Specific examples for the adjustment of the supplying for electric power systems are described later.

Next, it is confirmed whether the adjustment of supplying plan for the unit-group corresponding to the planning period is completed. (Step S308) If the overall output of the unit-group and the required output are equal as a result of the adjustment, it can be determined that the process for adjusting the supplying plan is complete for the unit-group. If the adjustment of supplying plan is complete, the plan generator 14 sends the supplying plan to the management server 50. The management server 50 saves the received supplying plan to the planning information database 57. (Step S311)

If the overall output of the unit-group is not equal to the required output, it is determined that the adjustment of the supplying plan needs to be continued. In this case, the planning unit to grant the authority to edit the supplying plan is specified. The plan generator 14 sends the updated supplying plan to the planning unit which is granted the authority to edit the supplying plan in the next turn. (Step S309) The planning unit which obtains the authority to edit the supplying plan in the next turn is determined by the unit selector 13. Then the process for generating the supplying plan is executed in the next planning unit. (Step S310) The planning unit which is granted the authority to edit the supplying plan executes step S301 and later steps to adjust the supplying plan.

When the adjustment of the supplying plan is complete, the supplying plan is saved in the planning information database 57 of the management server. (Step S311) Then, the supplying plan is sent (broadcasted) to all the planning units belonging to the unit-group. (Step S312) The plan generator 14 reads the supplying plan stored in the storage 16 and sends the supplying plan from the communicator 15. All the planning units belonging to the unit-group can operate based on the same supplying plan.

Next, it is confirmed whether the generation of supplying plan is complete for all the planning periods. (Step S313) The plan generator 14 can specify the planning periods the supplying plan is not generated yet by referring to the planning information database 57 of the management server. Then, the first planning unit to grant the authority to edit the supplying plan within the next unit-group is selected. (Step S314) The planning unit that is granted the authority to edit the supplying plan in the next turn is determined by the unit selector 13. Then, the plan generator 14 sends the supplying plan to the planning unit which obtains the authority to edit the supplying plan in the next turn. (Step S315) The planning unit which is granted the authority to edit the supplying plan generates the supplying plan for a different planning period.

If the generation of supplying plan is completed for all the planning periods, the supplying plans are shared to all the planning units belonging to the system. (Step S316) In step S316, the management server 50 sends (broadcasts) the supplying plans for all the planning periods to all the planning units within the system. If each planning unit accesses the planning information database 57 in the management server 50 to obtain the supplying plan of other unit-groups, step S316 can be skipped.

If step S315 or step S316 is executed, the generation of supplying plan is completed. If the supplying plans for all the planning periods are prepared, the system can operate based on the operation plan.

Next, the process for generating the supplying plan for electric power systems with multiple electric power stations is explained as an example of specific application. FIG. 13 is an example of operation condition data for cases when the operation units are electric power stations.

The operation condition data is used for controlling the operation unit. The operation condition data is the subset of the unit data. If the operation units are electric power stations, the operation condition data is the unit ID, the minimum power generated $P_{min}$, the maximum power generated $P_{max}$, the rate of change for the generated power $\Delta P$, minimum uptime, minimum downtime, cold start-up cost (CSC), hot start-up cost (HSC), shut-down cost (SDC), cost functions $C(P_i)$ and coefficients (a, b, c, e, ρ) of the cost functions. The equation (1) below, can be used as the cost function, for example.

$$C(P_i)=a_i+b_iP_i+c_iP_i^2+|e_i \sin[\rho_i(P_{min,i}-P_i)]| \quad (1)$$

Here, Pi is the power generated by the operation unit (electric power station) with the unit ID i. The equation (1) is only an example. Different functions can be used as the cost function. For example, the derivative of the cost function can be used. Also, the product of the derivative of the cost function and average value of cost function can be used.

In the table of FIG. 13, operation condition data for 10 operation units are shown. The units IDs 0001-0010 in the leftmost column are unique identifiers for each operation unit. Thus, each row in the table corresponds to each operation unit. The operating cost of each operation unit can be calculated by substituting the data in table of FIG. 13 to the cost function $C(P_i)$. The cost function $C(P_i)$ is a function which takes the output of the operation units (the generated power) as the parameter. Therefore, the operating cost for each operation unit depends on the generated power.

Some restrictions may exist for the operation units (electric power stations). In the example shown in FIG. 13, the generated power $P_i$ needs to be within the range of $[P_{min,i}, P_{max,i}]$. Here, $P_{min,i}$ is the minimum power generated by the electric power station with unit ID i. $P_{max,i}$ is the maximum power generated by the electric power station with unit ID i.

Restrictions exist for changing the generated power, which is the output of the electric power stations. The electric power stations can change the value of generated power within the rate of change, in a single operation. The equation (2) below describes the rate of change for generated power allowed in a single operation.

$$P_i(t-1)-\Delta P_i \le P_i(t) \le P_i(t-1)+\Delta P_i \quad (2)$$

Here, $P_i(t)$ is the generated power after adjusting the output. $P_i(t-1)$ is the generated power before adjusting the output. $\Delta P$ is the rate of change for generated power regarding electric power stations with unit ID i.

Some restrictions exist for the start-up and shut-down timings of the electric power stations. In order to stop an electric power station, the continuous operation time before the shut-down needs to be equal to or greater than the minimum uptime. In order to start an electric power station, the continuous stop time before the start-up needs to be equal to or greater than the minimum downtime. The minimum uptime and the minimum downtime were restrictions for the selection of unit-group candidates as well.

The cold start-up cost and hot start-up cost in FIG. 13 are costs required to launch the electric power station. The type of cost used depends on the conditions for calculating costs. If the downtime of the electric power station is lower than threshold, the hot start-up cost is used. If the downtime of the electric power station is equal to or greater than the threshold, the cold start-up cost is used. Usually, the cold start-up cost takes a greater value compared to the hot start-up cost. The shut-down cost is the cost required to stop an electric power station.

The start-up costs and the shut-down costs are also restrictions for selecting the unit-group candidates. Since these costs are the part of cost required for starting and stopping the operation units, these costs are also scores that indicate the costs required to switch unit-groups.

The plan generator 14 in the planning unit generates a supplying plan which fulfills restrictions such as the maximum generated power, the minimum generated power, the maximum rate of change for generated power or the like. These scores are only examples of operation condition data. It is possible to use other scores to set restrictions. Supplying plans can be generated by using other scores.

Figure 14:
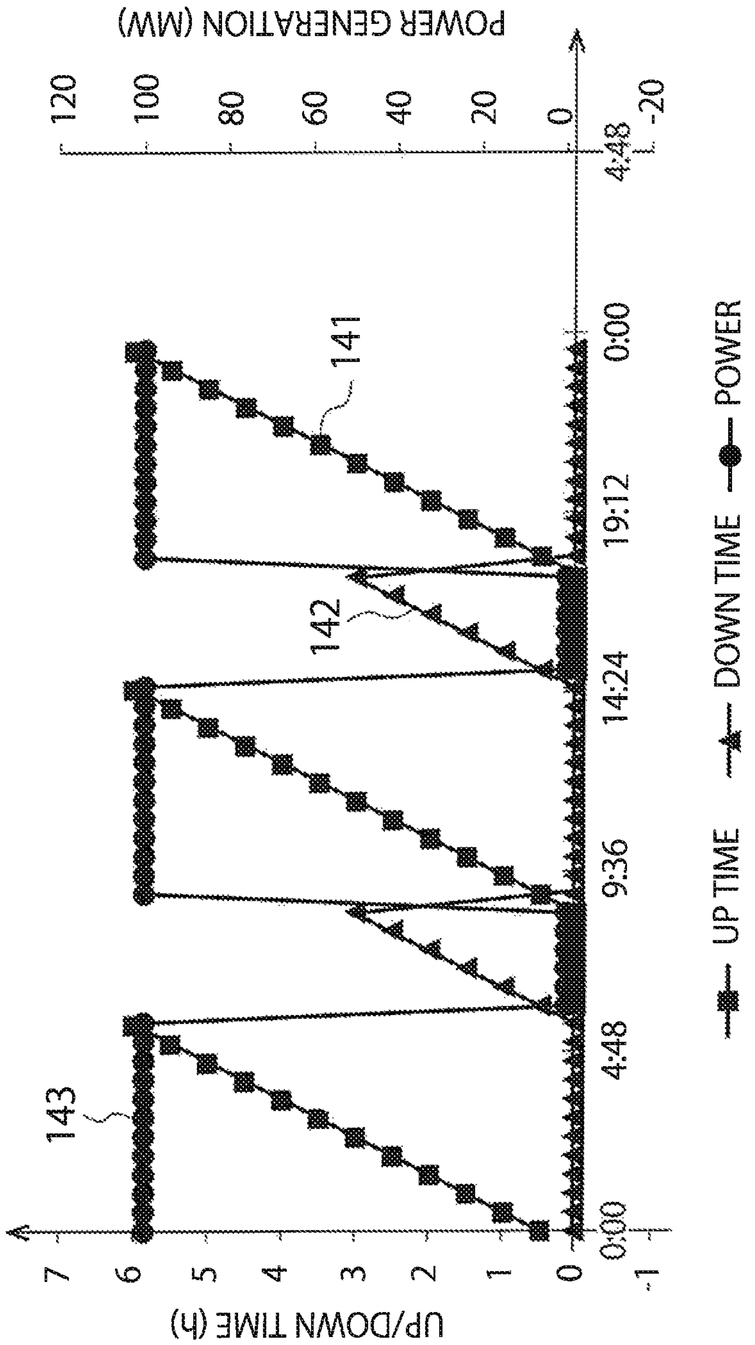
FIG. 14 is a diagram showing an example of the operation time, stop time and maximum power generated for an electric power station.

FIG. 14 is a graph showing examples of uptime, downtime and maximum generated power for an electric power station. Data series 141 is the uptime. Data series 142 is the downtime. Data series 143 is the maximum generated power. The horizontal axis of the graph in FIG. 14 represents the time. For data series 141 and 142, the vertical axis is representing the continuous operation time or the continuous stop time. For data series 143, the vertical axis is representing the supplied electricity in units of MWs. As shown in FIG. 14, there are cases when the operation unit is stopped for a certain period after running the operation unit for a certain time. Such operation is done when periodic maintenance and inspections are needed for the operation units. In some cases, extent of wear or aging for operation units needs to be balanced.

Figure 15:
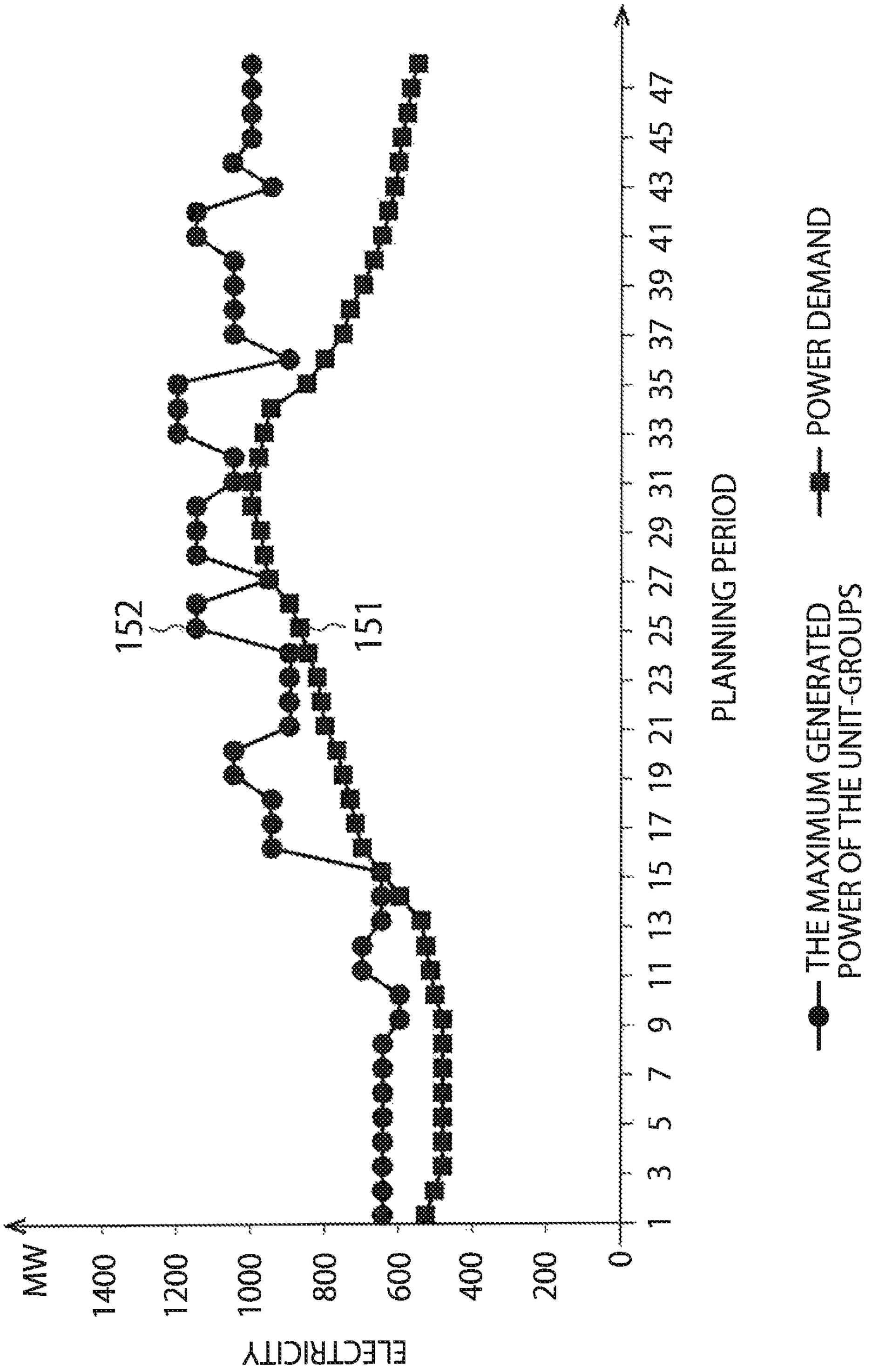
FIG. 15 is a diagram showing maximum power generated by a unit-group.

FIG. 15 is a graph showing an example of the maximum generated power of a plurality of unit-groups. Data series 151 represent the power demand. Data series 152 represent the maximum generated power of the unit-groups. The vertical axis of the graph represents the electricity. The horizontal axis of the graph represent the planning period. The planning period in the graph of FIG. 15 corresponds to the time in graph of FIG. 5. Thus, in the example of FIG. 15, a single day is divided into 48 planning periods. Data series 151 is the same data as the power demand shown in the graph of FIG. 5.

Referring to FIG. 15, for nearly all the planning periods, the electricity of the data series 152 which represent the maximum generated power of the unit-groups takes a larger value compared to the data series 151 which represent the demand of electricity. Thus, there is sufficient generation reserve margin for most of the planning periods. The data series 152 is the maximum output of the unit-groups selected by the unit-group selector 12. The supplying plan is adjusted by the plan generator 14, so that each unit-group generates electricity equal to the power demand. It can be inferred that for the 15th planning period and the 27th planning periods, there are some operation unit failures.

If there is a risk of shortage in electric power supply due to failures of operation units or increased power demands, alternative operation units are selected based on the priority values, if available. Operation units that satisfy the restrictions of maximum generated power, the minimum generated power, rate of change for generated power are selected as alternative operation units. The ratio between the power generated by the operation unit and the operating cost can be used as the priority. By executing the aforementioned procedures, the maximum generated power for the 16th and the 28th planning periods become greater than the previous planning periods. Sufficient generation reserve margins are allocated for the respective planning periods.

Figure 16:
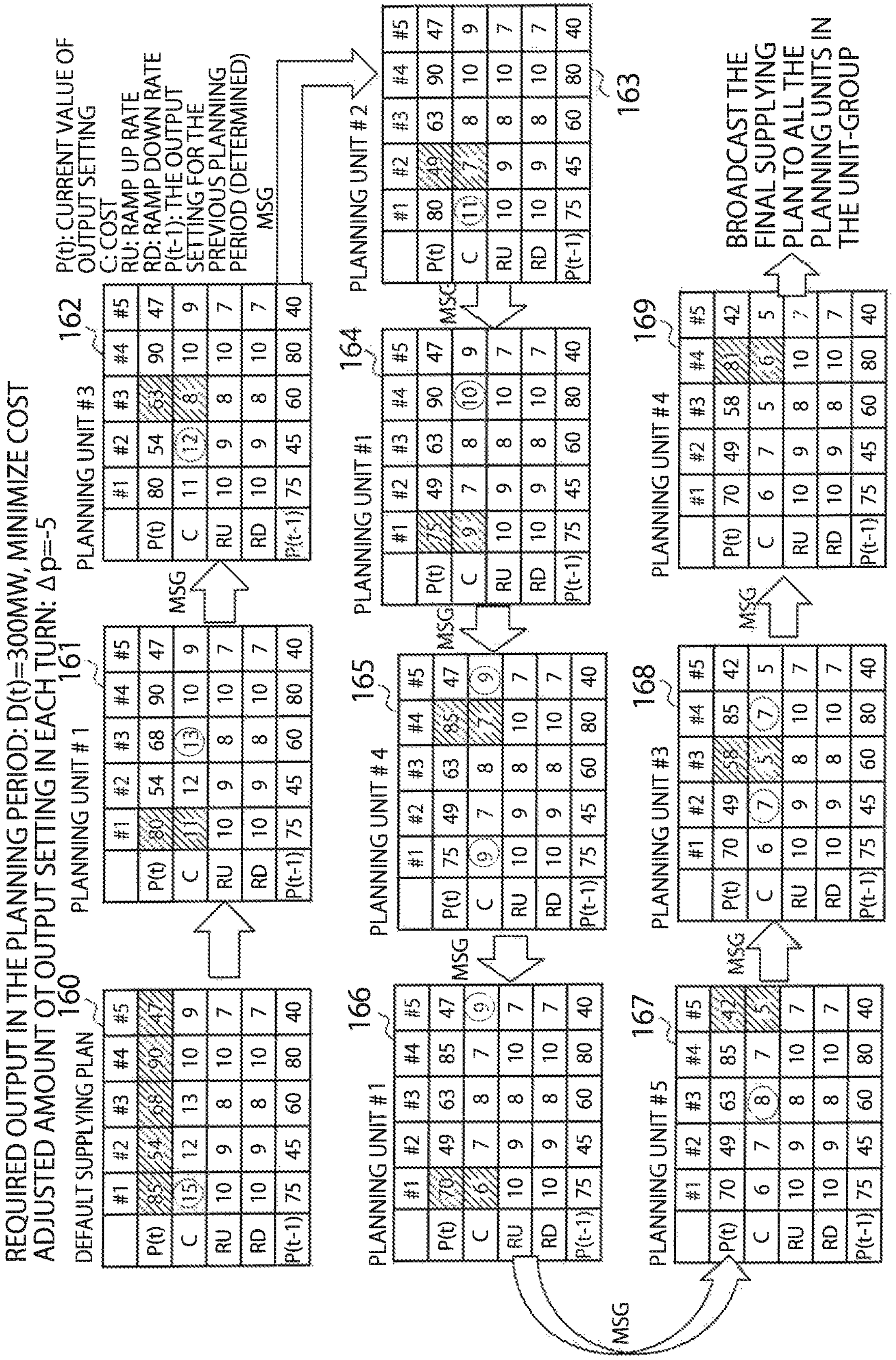
FIG. 16 is a diagram showing an example of a supplying plan for a unit-group corresponding to a planning period.

FIG. 16 is a diagram showing an example of a supplying plan for a unit-group corresponding to a planning period. In FIG. 16, the output setting (planned amount of generated electricity) is adjusted for each operation unit (electric power station).

Tables 160-169 shown in FIG. 16 are supplying plans for each stage in the process. Below, data stored in each of the tables are explained. The values stored in the tables are electricity in units of MW, except the cost C in the third row.

The symbols #1, #2, #3, #4, #5 in the first rows of the tables 160-169 correspond to operation units. For example, the data corresponding to operation unit #1 is stored in the second column. Data for operation unit #2 is stored in the third column. The electric power system in the example of FIG. 16 includes 5 electric power stations (operation units). Each electric power station is paired with a planning unit. Operation units #1-#5 are paired with the planning units with the same symbols. For example, operation unit #4 is paired with planning unit #4. Operation unit #5 is paired with planning unit #5.

The values in the second row of tables 160-169 are the output settings (planned amount of generated electricity) P(t) in the current stage. For example, in table 160, the current output setting for operation unit #5 is 47 MW. For operation unit #1, the current output setting is 85 MW.

The values in the third row of tables 160-169 are cost C. The cost C can be calculated by substituting the values of output setting P(t) for each stage, to the cost functions. For example, the equation (1) described above can be used as the cost function. In table 169, the cost for operation unit #1 is 6. The cost for operation unit #2 is 7, and the cost for operation unit #3 is 5.

The values in the fourth row of the tables 160-169 are the ramp up rates RU. The ramp up rate RU is an example of the rate of change for generated power. The ramp up rate RU represents the maximum amount of generated power that can be increased in a single turn. Since the ramp up rate RU is defined in the specification for each operation unit, the ramp up rates take fixed values in the example of FIG. 16. For example, the ramp up rate for operation unit #1 is 10 MW. The ramp up rate for operation unit #2 is 9 MW and the ramp up rate for operation unit #3 is 8 MW.

The values in the fifth row of the tables 160-169 are the ramp down rates RD. The ramp down rate RD is an example of the rate of change for generated power. The ramp down rate RD represents the maximum amount of generated power that can be decreased in a single turn. Since the ramp down rate RD is defined in the specification for each operation unit, the ramp down rates take fixed values in the example of FIG. 16. For example, the ramp down rate for operation unit #4 is 10 MW. The ramp up rate for operation unit #5 is 7 MW.

The values in the sixth row of the tables 160-169 are the output settings P(t−1) for each operation unit in the previous planning period. Since the operation units in the embodiment are electric power stations, the output setting P(t−1) corresponds to the planned amount (output setting) of generated electricity for the previous planning period. Here, the previous planning period means the planning period which is chronologically just before the current planning period. For example, if there are planning periods p1, p2, p3, p4 and p5 in chronological order, the planning period just before the planning period p3 is planning period p2. In the example of FIG. 16, the generation of supplying plan for the previous planning period is completed. Therefore, the value of the output P(t−1) is already determined.

The maximum value that is configurable as the output setting P(t) for a planning period is P(t−1)+RU. The minimum value that is configurable as the output setting P(t) for a planning period is P(t−1)−RD. For example, the output setting P(t−1) is 75 MW for operation unit #1. The ramp up rate RU is 10 MW and the ramp down rate RD is 10 MW. Therefore, the final value of output setting P(t) needs to be set to a value within the range of 65-85 MWs, by adjusting the supplying plan, for the corresponding planning period. For the operation unit #2, the output setting P(t−1) is 45 MW. The ramp up rate RU is 9 MW and the ramp down rate RD is 9 MW. Therefore, the final value of output setting P(t) needs to be within the range of 36-54 MWs for the corresponding planning period.

For the example in FIG. 16, the condition for completing the adjustment of supplying plan is when the overall output of the electric power system equals 300 MW. (FIG. 12 Step S308) In table 160, which is the default supplying plan, the total value of output settings P(t) is 344 MW. Therefore, the output settings for each operation unit need to be decreased during the adjustment of supplying plan.

The adjustment of supplying plan can be executed under more than one condition. In the field of electric power systems, lower operating costs are required. Therefore, minimization of costs is set as the condition. In the example of FIG. 16, the goal is to set the output of the electric power system to the target value, 300 MW while reducing the operating costs of the electric power stations.

The price of the fuels and the maintenance fees depend of the type of electric power stations. Although the same amount of electricity is generated, the operating costs would depend on the electric power stations. Therefore, a combination of electric power stations that reduce the operating costs should be operated in the operation plans, while supplying electricity sufficient to fulfill the power demand.

If the authority to edit the supplying plan is granted to the planning unit, it is possible to determine the amount of output setting which can be adjusted in a single turn. In FIG. 16, if the authority to edit the supplying plan is granted to any of the planning units, the amount of output setting which is adjusted is set to Δp=−5. The amount of adjusted output setting can be a constant value or a non-constant value.

Next, the processes executed in each table are explained. In FIG. 16, the generation of supplying plan is executed in the order of; table 160, 161, 162, 163, 164, 165, 166, 167, 168 and 169.

Table 160 is the default supplying plan. The default supplying plan is generated by adding the rate of change for generated power to the output setting P(t−1) of the previous planning period. The shaded section of table 160 is the initial output setting P(t). Then, the cost is calculated using the initial value of P(t). The cost can be obtained by substituting P(t) to the cost function described in equation (1). Here, the cost of operation unit #1 became the greatest among the 5 operation units. Therefore, the authority to edit the supplying plan is granted to planning unit #1.

The table 161 is the supplying plan after the adjustment by the planning unit #1. Since the cost of operation unit #1 was the greatest, the output setting of operation unit #1 is adjusted by Δp. The output setting of operation unit #1 which was 85 is adjusted to 80. The cost for operation unit #1 is recalculated using the adjusted output setting value. After the recalculation, the cost which was 15 is reduced to 11. Since the cost of operation unit #3 became the greatest after the update of supplying plan, the authority to edit the supplying plan is granted to planning unit #3.

Table 162 is the supplying plan after adjustment by the planning unit #3. Since the cost of operation unit #3 was the greatest, the output setting for the operation unit #3 is adjusted by Δp. The output setting of operation unit #1 which was 69 is adjusted to 63. By using the readjusted output setting, the cost of operation unit #3 is recalculated. After the recalculation, the cost which was 13 is reduced to 8. Since the cost of operation unit #2 became the greatest after the update of supplying plan, the authority to edit the supplying plan is granted to planning unit #2.

The processes executed for the tables 163-469 are similar to the processes executed for tables 161 and 162. The update of supplying plan is repeated until the total value of the output settings for operation units #1-#5 is equal to the required output D(t). In table 169, the total value of output setting P(t) is 300 MW, after the update of supplying plan by the planning unit #4. Therefore in the stage of table 169, the adjustment of supplying plan for the corresponding planning period is completed. Planning unit #4 sends (broadcasts) the data of table 169 to all the planning units belonging to the unit-group.

If the output setting becomes smaller than P(t−1)−RD for an operation unit, during the update of supplying plan, the output setting for the operation unit is readjusted to P(t−1)−RD. If the output setting of an operation unit that is paired with a planning unit having the authority to edit the supplying plan is reaching to the maximum value or the minimum value, the output setting cannot be adjusted. In such cases, the adjustment of output setting is skipped. Instead, the planning unit with the second greatest cost is granted the authority to edit the supplying plan.

In the example of FIG. 16, the process for generating the supplying plan was executed while the minimization of operating costs for each electric power station and the rate of change for generated power (the ramp up date and the ramp down rate) is within a specific range. These conditions are only an example. Other conditions may be set when the generation of supplying plan is executed. Also, in the example of FIG. 16, a case where the output settings for each operation unit are reduced was explained. However, it is also possible to increase the output settings for each operation unit. If the output setting needs to be increased, the amount of adjustment Δp is set to a positive value.

Next, the adjustment of supplying plan, executed when each planning unit is granted the authority is described.

Figure 17:
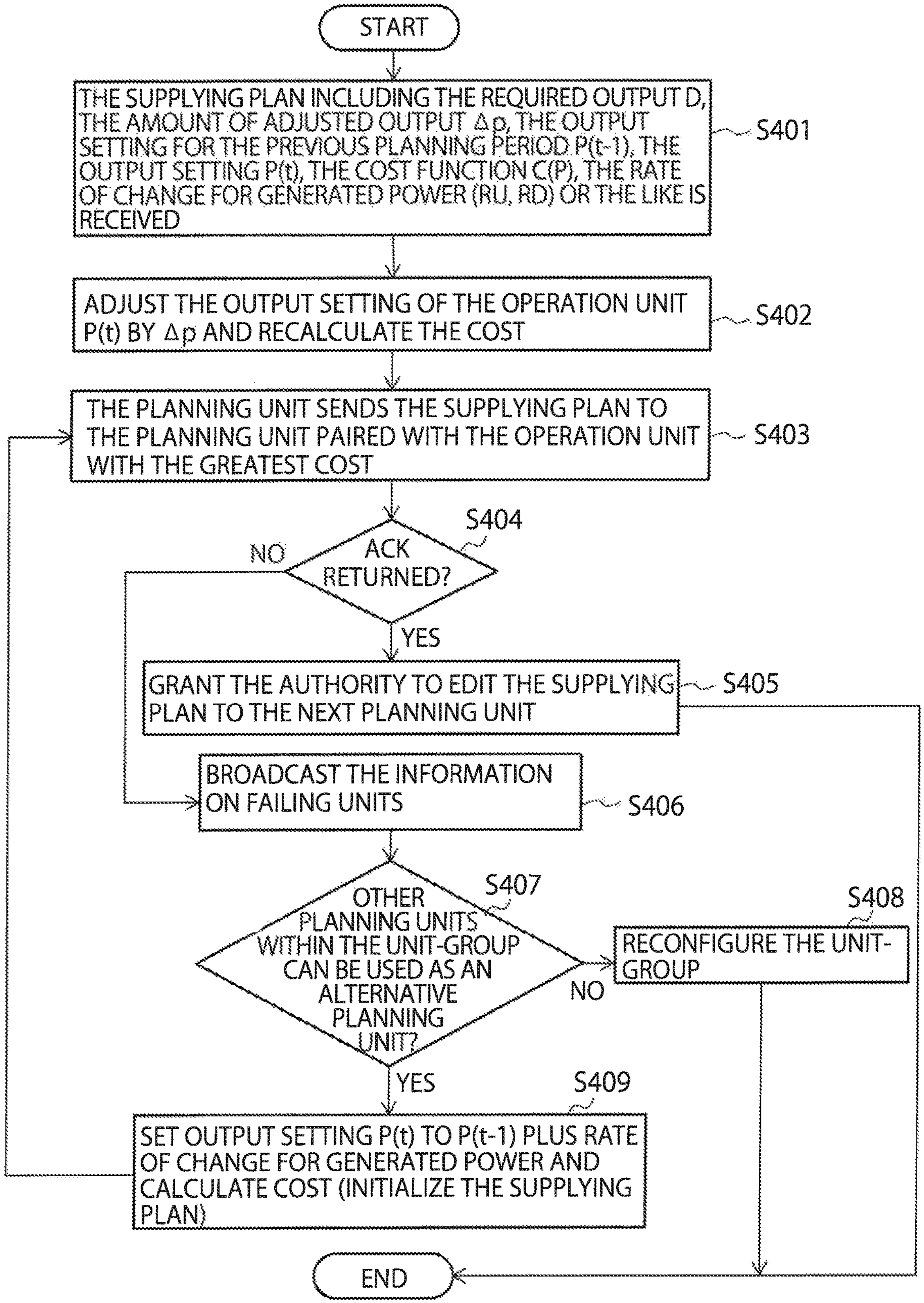
FIG. 17 is a flowchart showing adjustment of the supplying plan.

FIG. 17 is a flowchart showing the adjustment of the supplying plan. Below, the processes are described in reference to FIG. 17.

The planning unit with the authority to edit the supplying plan receives the supplying plan from the planning unit that had the authority to edit the supplying plan in the previous turn. (Step S401) The supplying plan includes the required output D, the amount of adjusted output Δp, the output setting for the previous planning period P(t−1), the output setting P(t), the cost function C(P), the rate of change for generated power (RU, RD) or the like, for example. The supplying plan does not necessarily need to include all of the above elements. Other elements can be included in the supplying plan as well. For examples, factors related to the environmental load may be included in the supplying plan. For example, a supplying plan which minimizes emission of carbon dioxides, nitrogen oxides, sulfur oxides, amount of chemicals in the liquid waste, the amount of waste or the like can be included.

Next, the planning unit adjusts the value of output setting for supplying plan, by Δp. The value of output setting after the adjustment is P'(t)=P(t)+Δp. If the amount of adjusted output Δp is positive, the output setting P'(t) increases. If the amount of adjusted output Δp is negative, the output setting P'(t) decreases. Then the cost is recalculated using the adjusted output setting P'(t). For the calculation of cost, the cost function C(P) is used. (Step S402)

The planning unit searches the costs for all the operation units within the supplying plan. The planning unit sends the supplying plan to the planning unit paired with the operation unit with the greatest cost. (Step S403)

Next, the planning unit which sent the supplying plan waits until the acknowledge response (ACK) is returned from the destination planning unit. (Step S404) If the ACK is returned, the authority to edit the supplying plan is granted to the next planning unit. (Step S405) If the authority to edit the supplying plan is granted to the next planning unit, the next planning unit executes step S401 and later.

If the ACK is not returned within the waiting period, it is determined that the planning unit in the destination has failed. The planning unit which sent the supplying plan sends (broadcasts) the information on failed units to all the planning units belonging to the unit-group. (Step S406)

Next, the planning unit confirms whether other planning units within the unit-group can be used as an alternative planning unit. (Step S407) For the operation units paired with other planning units, the maximum output, the rate of change for generated power or the like are referred. Based on the referred values, it is determined whether some other planning unit within the unit-group can be used as an alternative planning unit. If there are no alternative planning units, the unit-group is reconfigured. (Step S408) During the reconfiguration of the unit-group, it is confirmed whether the unit-groups that are already generated can be used. If there are no unit-groups that can be used alternatively, a new unit-group is generated.

If an alternative planning unit is found, the supplying plan for the alternative planning unit is initialized. If there are multiple planning units that can be used alternatively, the planning unit with the highest priority value is selected. Specifically, the rate of change for generated power is added to the output for the previous planning period P(t−1) and set as the value for output setting P(t) of the operation unit, paired with the alternative planning unit. The cost is calculated based on this value of output setting P(t). (Step S409) If the supplying plan for the new planning unit is initialized, the supplying plan is sent (broadcasted) to all the planning units belonging to the unit-group. Then, the process returns to step S403 and the planning unit with the greatest cost is searched.

Above, the generation of operation plan executed before the start-up of system was described. If the operation plan is generated, the system can run according to the operation plan. However, there are cases when the operation plan needs to be regenerated while keeping the system operating, after the start-up of system. For example, if some of the electric power stations failed or, if the increase of power demand exceeded anticipated levels, the regeneration of operation plan needs to be done as soon as possible, to prevent shortage of electric power or discontinued supply of electric power. Thus, in the system according to the embodiment the operation plan can be changed when the system is running.

In order to handle changes in the operation plan when the system is running, the system according to the embodiment detects the fluctuations of demand or changes in unit configuration during system operation. In the following, the process of detecting changes during system operation is described.

Figure 18A:
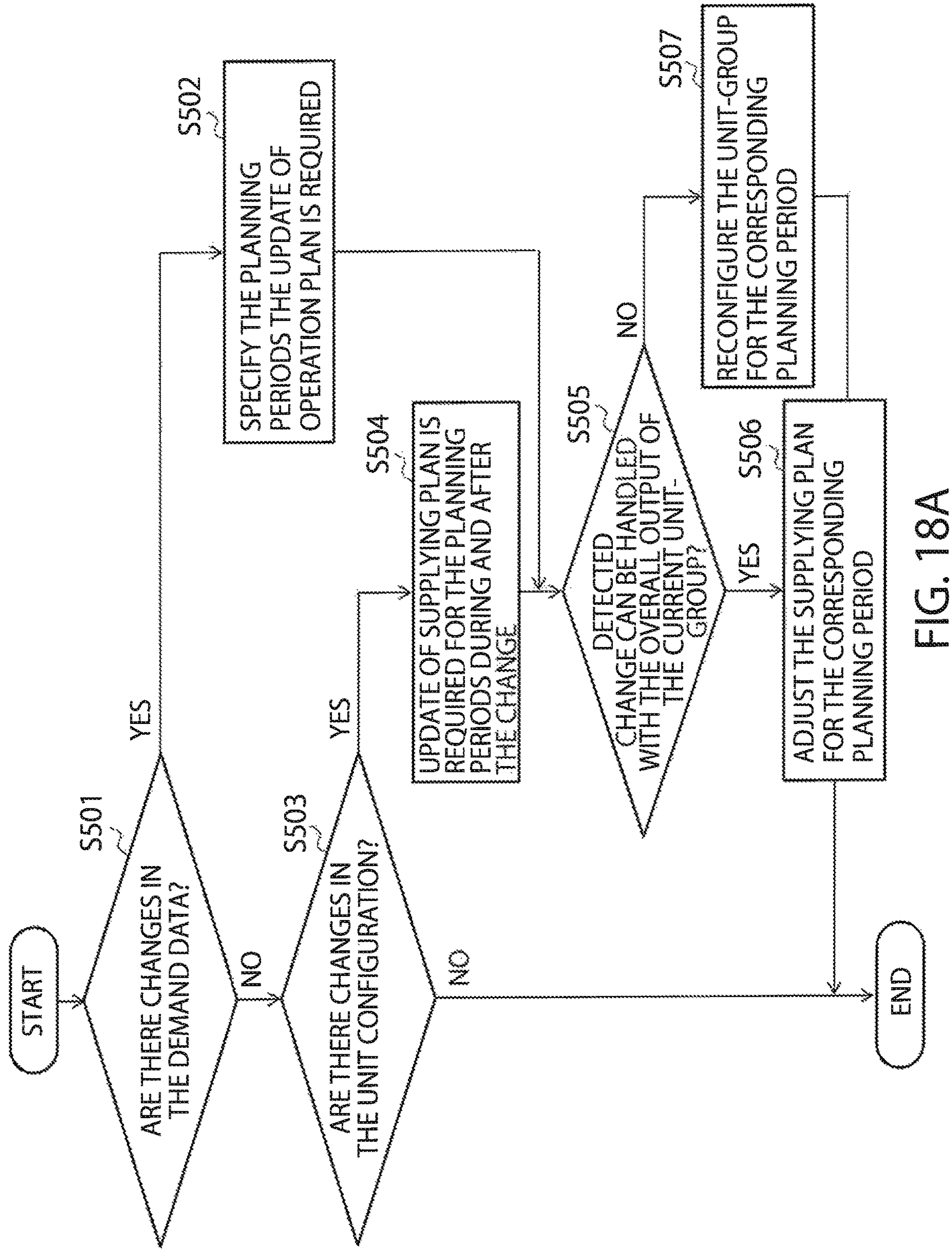
FIG. 18A is a flowchart showing detection of changes during system operation.

FIG. 18A is a flowchart showing detection of changes during system operation. Below, the process is explained in reference to the flowchart in FIG. 18A.

In step S501, it is checked whether there are changes in the demand data. The plan generator 14 refers to the demand information database 55 in the management server 50 to confirm whether there are some increases or decreases in the required output for any of the planning periods. If there are no changes in the required output, the process proceeds to step S503 to confirm whether there are changes in the unit configuration. If there are changes in the required output, the process proceeds to step S502 to specify the planning periods the update of operation plan is required. If there is a possibility that shortage of electricity may occur, the operation plan is updated. If the power demand decreases and the supply of electricity become redundant, the operation plan can be either updated or maintained.

In step S503, the change in unit configuration is detected. The plan generator 14 refers to the unit information database 56 in the management server to confirm the unit data. If there are failed planning units or operation units, deleted planning units or operation units or addition of pairs (pairs of planning units and operation units), it is determined that there are changes in unit configuration. If there are changes in unit configuration, the planning periods during the changes and after the changes in the unit configuration are selected as the planning units the update of supplying plan is required. (Step S504) If there are no changes in the unit configuration, the process shown in the flowchart of FIG. 18A is completed. If planning units and operation units belonging to the unit-group are failed and there is a risk of shortage in electric power supply, the update of operation plan is executed. If new pairs of planning units and operation units are added, the operation plan can be either updated or maintained.

In step S505, it is confirmed whether the detected change can be handled with the total output of the current unit-group. If there is a risk that the required output cannot be satisfied with the total output of the operable operation units, it is determined that the change cannot be handled with the update of supplying plan for the current unit-group.

If the detected change is so large that it cannot be handled with the output of the current unit-group, the reconfiguration of unit-groups for the corresponding planning periods are executed. (Step S507) After the reconfiguration of unit-group, the readjustment of the supplying plan for the corresponding planning periods are executed. (Step S506) If the change can be handled with the total output of the current unit-group, the composition of the unit-group is retained and the supplying plan for the corresponding planning period is readjusted. (Step S506) If the risk of electric power supply shortage can be avoided by increasing the total output of the current unit-group, only the readjustment of supplying plan is executed.

The adjustment of supplying plan during the operation of system is similar to the generation of supplying plan executed before the start of system, except the fact that the target planning periods are limited. Thus, the adjustment of supplying plan is executed according to the flowcharts of FIG. 11, FIG. 12 and FIG. 17.

The reconfiguration of the unit-group during the operation of system is executed according to the flowchart in FIG. 9. Also, if there are unit-group candidates without failed planning units and operation units, the unit-group candidate can be selected as the unit-group for a planning period.

The process for detecting changes during the operation of system can be executed periodically. Also, it can be executed manually by the operator. The management server can execute the process for detecting changes when it detected the change in demand. The planning unit can execute the process for detecting changes when it detected failures of operation units. The timing for executing the process for detecting changes during the operation of system is not limited.

In the embodiment according to the invention, the process for generating the operation plan does not concentrate to specific management servers. Since the process is distributed across multiple planning units, it is possible to reduce the overall workload. Thus, even if the number of operation units is large, the concentration of workload to a specific device is avoided, reducing the response time required for generation and updates of operation plans. The embodiment according to the invention can be applied to large scale systems with many operation units. Also, it is possible to expand the scale of system from small scales to large scales during the operation of system. By applying the embodiment according to the invention, it is possible to generate and update operation plans for highly scalable systems.

For the system according to the embodiment, the planning unit which is the leader unit performs the main roles in the first half of process for generating the operation plan. For example, the generation of the unit-group candidates, the selection of the unit-groups and the initial section of the process for generating the supplying plan are executed by the leader unit. If the leader unit fails when it is generating the operation plan, the process for generating the operation plan may halt abruptly. To prevent the process from being stopped, the system can have features for detecting the failure of the leader unit.

For example, the leader unit can send heartbeat signals to other planning units or the management server 50. If the other planning units or the management server 50 cannot receive the heartbeat signals, it can be presumed that the operation of the leader unit has failed. Timeout periods can be set for each step. If there are no responses received from the leader unit within the timeout period, it can be determined that the leader unit has failed. The alternative planning unit can be determined based on the priority values. Alternative planning units can be determined by other methods, as well.

For the process of generating the supplying plan, similar methods can be applied to improve the reliability of the system. If the planning unit with the authority to edit the supplying plan fails during the generation of supplying plan, the process may halt abruptly since the other planning units do not have the authority to edit the supplying plan. In order to prevent the processes from stopping, the planning unit with the authority to edit the supplying plan can save the updated cost C(P) in the unit information database 56 of the management server. If the planning units belonging to the unit-group cannot receive any data from the planning unit with the authority to edit the supplying plan, the unit information database 56 in the management server 50 is referred. In this case, the planning unit with the second greatest cost C(P) obtains the authority to edit the supplying plan. By executing the aforementioned procedures, it is possible to make the system fault tolerant.

In electric power systems, new electric power stations (operation units) may be added to the system, once in a few years, in accordance with the increase of power demand over the years. In factories, if the demand for products increases, manufacturing equipment or lines (operation units) are added. In such cases, a pair of a new operation unit and a new planning unit is added to the operation planning system.

When a pair of an operation unit and a planning unit is added to the system, the newly added planning unit sends a message to the management server 50, launching the unit adding-deleting unit 52. The newly added planning unit writes information on the paired operation unit into the unit information database 56. Then, the management server 50 notifies all the planning units in the system that a pair of operation unit and planning unit is added to the system. Since each planning unit can get information on the configuration changes in real time, it is possible to update the operation plan without stopping the system.

(First Variation)

In the system according to the first embodiment described above, a plurality of planning units belonging to the unit-group was operating cooperatively to generate the supplying plan. By using a system with the same configuration as the system according to the first embodiment, it is possible to have only some of the planning units to execute the process for generating the supplying plan. A single planning unit can generate the supplying plan. Below, the procedure of a single planning unit generating the supplying plan for a unit-group is described.

The planning unit with the fastest processing speed in the unit-group can be selected as the planning unit which generates the supplying plan. This selection can be done based on the benchmark scores, average response time, for example. If the selected planning unit fails or the processing speed is slowed down, other planning units belonging to the unit-group can execute the process for generating the supplying plan. Thus, it is possible to accelerate the process for generating the supplying plan. The selection of planning unit described above is only an example. Other methods can be applied when the planning unit is selected.

Figure 18B:
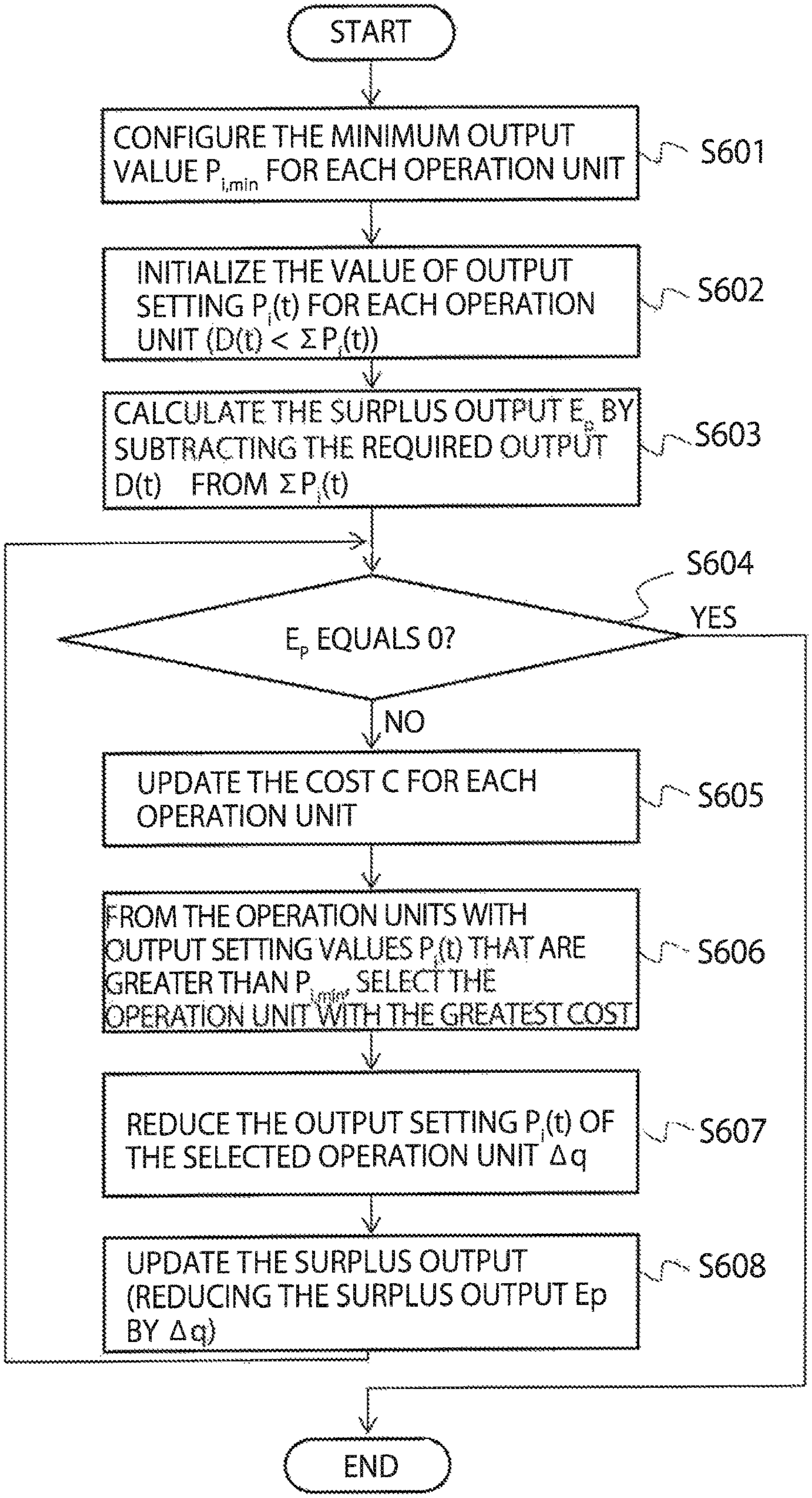
FIG. 18B is a flowchart showing generation of the supplying plan according to a first variation.

FIG. 18B is a flowchart showing detection of changes during system operation. In below, the procedures are described in reference to the flowchart of FIG. 18B.

The planning unit which generates the supplying plan configures the minimum output value $P_{i,min}$ for each operation unit. (Step S601) The minimum output value $P_{i,min}$ is the lowest configurable output value for an operating unit. For the minimum output value $P_{i,min}$, it is possible to use the product of the minimum recommended output of the unit defined in the specification and a value equal to or greater than 1.

Next, the value of output setting $P_i(t)$ for each operation unit belonging to the unit-group is initialized. (Step S602) Here, the output setting $P_i(t)$ is adjusted so that the value of $P_i(t)$ is greater than $P_{i,min}$ and the sum of output settings for each operation unit $\Sigma P_i(t)$ is greater than the required output D(t). During initialization, the maximum recommended output defined in the specification of each operation unit can be set to $P_i(t)$. $P_i(t)$ can be set to $P_i(t-1)+\Delta P_i$, which is the output setting for the previous planning period plus the rate of change of generated power.

Next, the surplus output $E_p$ is calculated from $\Sigma P_i(t)-D(t)$ which is the sum of output settings for each operation unit minus the required output. (Step S603) In the later steps, the output setting $P_i(t)$ for any of the operation units are reduced until the surplus output $E_p$ is 0.

In step S604, it is confirmed whether the surplus output $E_p$ is 0 or not. If the surplus output $E_p$ is 0, the generation of supplying plan for the flowchart in FIG. 18B is completed. If the surplus output $E_p$ is greater than 0, the cost for each operation unit is updated. (Step S605) The cost C is calculated by substituting the output setting $P_i(t)$ for each operation unit, into the cost function. Equation (1) can be used as the cost function, for example. This cost calculation method is only an example and other methods can be used. For example, the derivative of the cost function can be used. Also, the product of the cost function and the derivative of the cost function can be used.

Next, from the operation units with output setting values $P_i(t)$ that are greater than $P_{i,min}$, the operation unit with the greatest cost C is selected. (Step S606) Then, the output setting $P_i(t)$ of the selected operation unit is reduced by Δq. (Step S607) Here, Δq is the amount of output setting that is adjusted. The adjusted amount Δq takes a positive value. Values of Δq can be 0.1, 0.2, 0.5, 1.0, for example. However, other values can be used as well. Δq can be a constant value. Δq can also be an adjustable parameter.

If the output setting of the operation unit is adjusted, the surplus output $E_p$ is updated by reducing the surplus output $E_p$ by Δq. (Step S608) After the update of surplus output $E_p$, the process returns to step S604. In step S604, it is confirmed whether the surplus output $E_p$ is 0. If the surplus output $E_p$ is greater than 0, the procedures described in step S605 and later are repeated.

The number of planned units that are involved in the generation of supplying plan can be changed during the operation of the operation planning system. If more than 2 planning units belonging to the unit-group are involved in the generation of the supplying plan, the supplying plan is generated according to the procedures described in the first embodiment. However, if only a single planning unit is involved in the generation of supplying plan, the process is executed according to the process described in the first variation. If the number of planning units that execute the process for generating the supplying plan can be limited, it is possible to minimize the impact to system operation. There are cases when the maintenance and inspection of the system are necessary and some of the planning units need to be stopped temporary.

For each planning period, the planning unit which executes the aforementioned procedures of the first variation is selected from the planning units belonging to the unit-group for the corresponding planning period. Thus, the number of planning units which execute the process for generating the supplying plan is equal to the number of planning periods in the operation plan, unless some planning unit is selected more than twice, thereby balancing the workload. Even if only one planning unit generates the supplying plan for each planning period, if different units are selected for the leader units and different units are selected for generating the supplying plans for each planning period, the workload for generating the operation plan can still be distributed across different devices.

Second Embodiment

In the first embodiment, genetic algorithm was applied in the selection of unit-groups. However, the selection of unit-groups which is a form of combinatorial optimization can be executed by using other methods. In the second embodiment, reinforcement learning is used instead of genetic algorithm, for the selection of unit-groups. Besides the algorithm used by the unit-group selector 12, the features and the configuration of the operation planning system according to the second embodiment is similar to the operation planning system according to the first embodiment.

Figure 19:
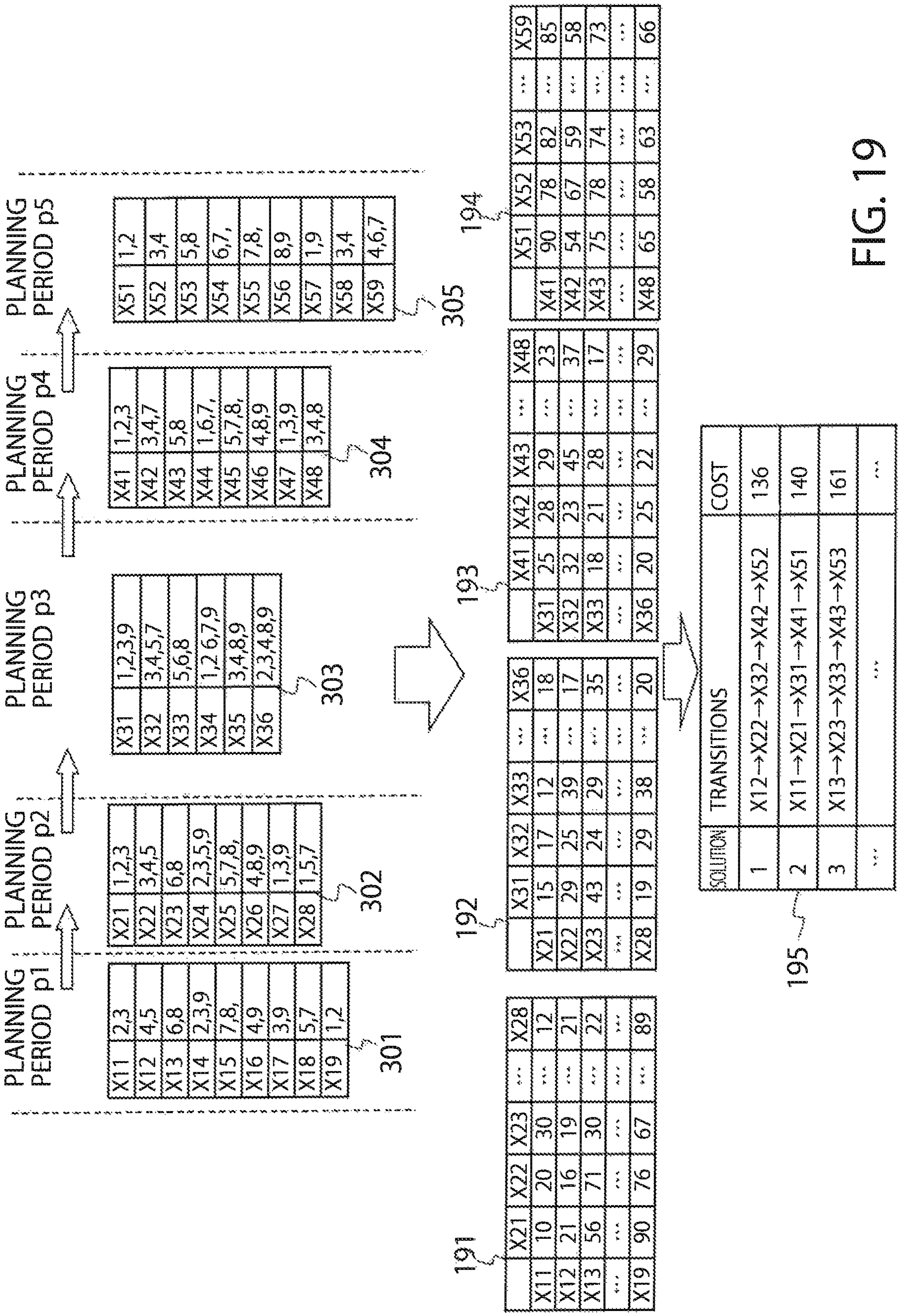
FIG. 19 is a diagram showing selection of unit-groups with reinforcement learning.

FIG. 19 is a diagram showing selection of unit-groups with reinforcement learning. Tables 301-305 shown in the top of FIG. 19 store a plurality of unit-group candidates for planning periods p1-p5. These unit-group candidates are the same as the ones used for the description of the first embodiment.

Next, the cost required for the transition between one unit-group candidate for a planning period and another unit-group candidate for the next planning period is calculated. In the middle of FIG. 19, the cost matrices which are storing the costs required for switching between unit-groups are shown. Table 191 is a cost matrix storing the costs required to switch between the unit-group candidates for planning period p1 and the unit-group candidates for planning period p2. Table 192 is a cost matrix storing the costs required to switch between the unit-group candidates for planning period p2 and the unit-group candidates for planning period p3. Table 193 is a cost matrix storing the costs required to switch between the unit-group candidates for planning period p3 and the unit-group candidates for planning period p4. Table 194 is a cost matrix storing the costs required to switch between the unit-group candidates for planning period p4 and the unit-group candidates for planning period p5.

If the operation units are electric power stations, the costs required for the transition are calculated by using the start-up cost, the shut-down cost and the power generation cost. For example, in table 192, the cost required for the transition between unit-group candidate X11 and the unit-group candidate X21 is the sum of the power generation cost for operation unit #2, the power generation cost for operation unit #3, and the start-up cost for operation unit #1. For table 194, the cost required for the transition between the unit-group candidate X41 and the unit-group candidate X51 is the sum of the power generation cost for the operation unit #1, the power generation cost for the operation unit #2 and the shut-down cost of the operation unit #3.

Next, a combination of unit-group candidates with the smallest costs for transitions is searched by using Q-learning, which is a form of reinforcement learning. The cost matrices (tables 191-194) are rewards for reinforcement learning. Table 195 in the bottom of FIG. 19 represents the costs required for each combination of unit-groups. By learning, it can be inferred that by selecting the combination of unit-group candidates X12, X22, X32, X42 and X52, the cost required for the transitions can be minimized.

The unit-group selector 12 selects unit-group candidate X12 as the unit-group for planning period p1. Similarly, the unit-group selector 12 selects unit-group candidate X22 as the unit-group for planning period p2. The unit-group selector 12 selects unit-group candidate X32 as the unit-group for planning period p3. The unit-group selector 12 selects unit-group candidate X42 as the unit-group for planning period p4. The unit-group selector 12 selects unit-group candidate X52 as the unit-group for planning period p5.

Here, the highest priority in the selection of unit-groups was set to minimizing the cost required for the transitions between the unit-groups. However, the selection of unit-groups can be executed based on other factors. For example, if the generated power for each operation unit can be calculated, the combination of unit-groups with the greatest generated power or the smallest minimum generated power can be selected. Various indicators for environmental load can be used as the reward in reinforcement learning, for the selection of unit-groups.

Third Embodiment

In the second embodiment, the unit-groups were selected by reinforcement learning. In the third embodiment, greedy algorithm is used for selecting the unit-groups. Besides the algorithm used by the unit-group selector 12, the features and the configuration of the operation planning system according to the third embodiment is similar to the operation planning system according to the first embodiment.

In the greedy algorithm, the unit-group is determined for a planning period, first. The unit-group with the determined configuration is called the basic unit-group. Then, unit-groups for neighboring planning periods are determined by adding or deleting pairs of operation units and planning units, to the basic unit-group. According to the restrictions, pairs of operation units and planning units that can be added or deleted can be determined. If the unit-groups for the neighboring planning periods are determined, the unit-groups for the planning period before or after the neighboring planning periods are determined by adding or deleting pairs of operation units and planning units. This operation is repeated until the unit-groups for all the planning periods are determined.

There are some variations for the greedy algorithm. For example, the planning period which is executed first or the planning period which is executed last, chronologically can be selected as the planning period the unit-group is determined first. The planning period with the smallest required output or the planning period with the greatest required output can be also selected. Other methods can be used to select the planning period the unit-group is determined first. The neighboring planning period can be either the planning period before the basic planning period or the planning period after the basic planning period. In the example below, the planning period the unit-group is determined first is the planning period which is executed first. The unit-groups for the planning periods executed later are determined afterwards.

Figure 20:
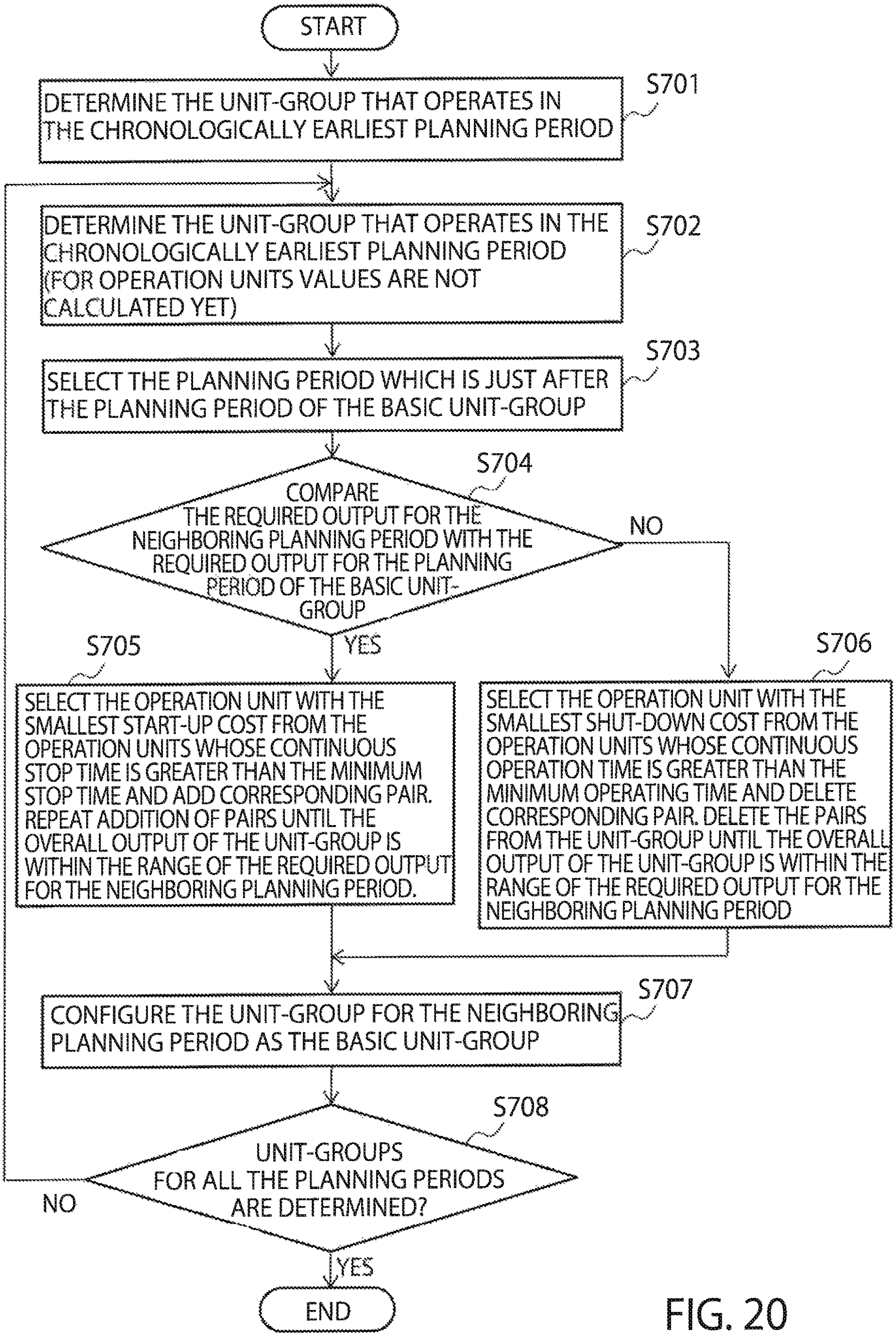
FIG. 20 is a flowchart showing selection of unit-groups with greedy algorithm.

FIG. 20 is a flowchart showing selection of unit-groups using greedy algorithm. The procedures are described in reference to the flowchart of FIG. 20.

First, the unit-group that operates in the chronologically earliest planning period is determined. (Step S701) Based on the output of each operation unit and the required output, the unit-group is determined. If the configuration of unit-group is determined, the corresponding unit-group becomes the basic unit-group.

Next, the shut-down cost for each operation unit belonging to the unit-group is calculated. (Step S702) The process of step S702 is executed for the operation unit the shut-down cost is not calculated yet.

Next, the planning period which is executed just after the planning period of the basic unit-group is selected. (Step S703) The newly selected planning period in step S703 is called the neighboring planning period.

Then, the required output for the neighboring planning period is compared with the required output for the planning period of the basic unit-group. (Step S704) If the required output for the neighboring planning period is greater, the operation unit with the smallest start-up cost is selected from the operation units whose continuous stop time is greater than the minimum stop time, and added to the neighboring planning period. Also, the planning unit that is paired with the operation unit is also added to the unit-group. The addition of pairs is repeated until the total output of the unit-group is within the range of the required output for the neighboring planning period. (Step S705)

If the required output for the neighboring planning period is smaller, the operation unit with the smallest shut-down cost is selected from the operation units whose continuous operation time is greater than the minimum operating time. This selected operation unit is deleted from the unit-group for the neighboring planning period. Also, the planning unit that is paired with the operation unit is deleted from the unit-group until the total output of the unit-group is within the range of the required output for the neighboring planning period. (Step S706)

If the required output for the neighboring planning period is equal to the required output for the planning period of the basic unit-group, or if the required output for the neighboring planning period is within the range of the required output for the planning period of the basic unit-group, the corresponding unit-group can be configured as the unit-group for the neighboring planning period.

In the next step S707, the unit-group for the neighboring planning period is configured as the basic unit-group. If the unit-groups for all the planning periods are determined, the process for selecting the unit-groups is complete. (Step S708) If there are planning periods with no unit-groups assigned, the procedures in step S602 and later are repeated. (Step S708)

Figure 21:
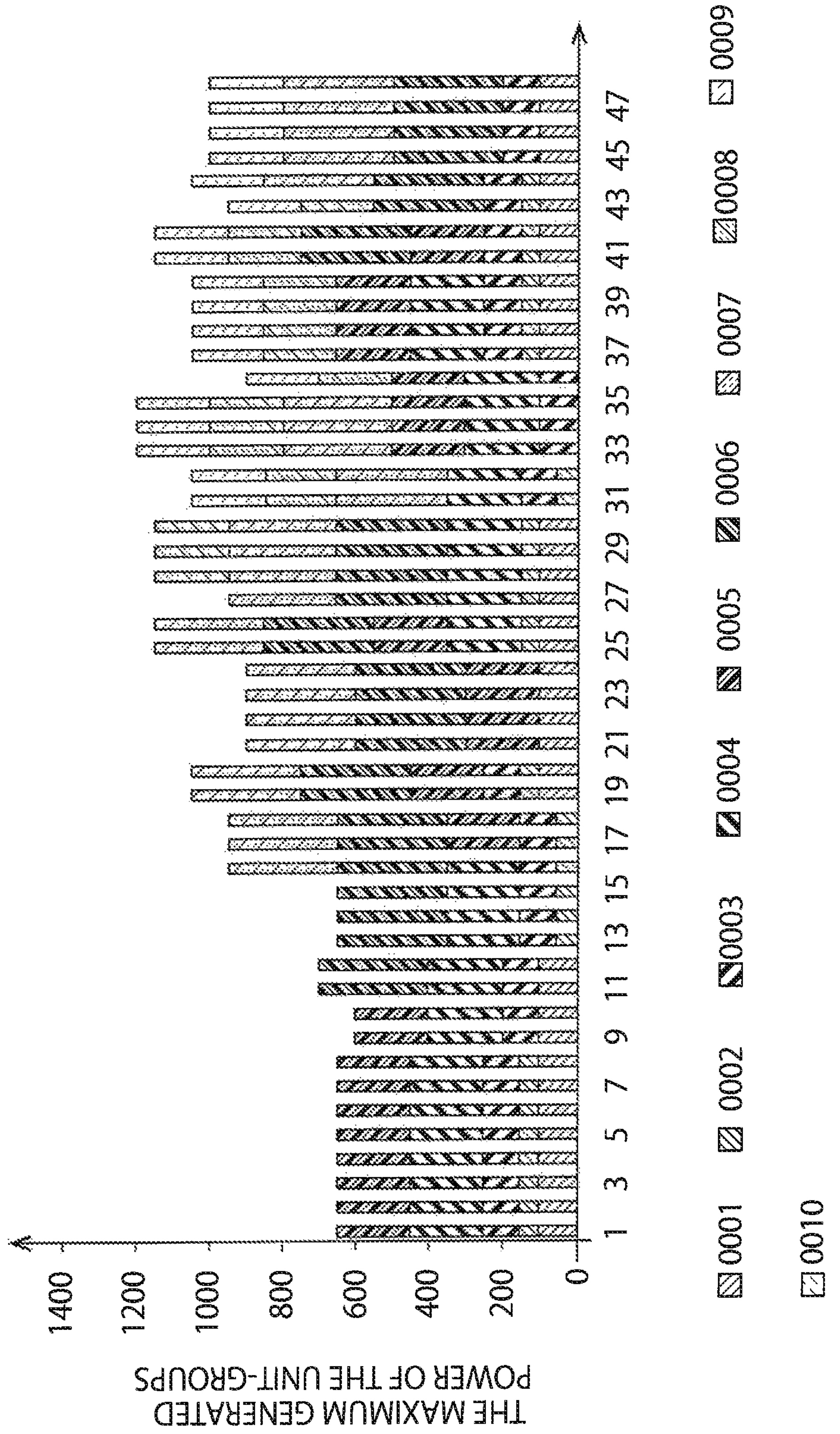
FIG. 21 is a diagram showing unit-groups selected by greedy algorithm.

FIG. 21 is a diagram showing unit-groups selected by greedy algorithm. The numbers 0001-0010 in FIG. 21 are unit IDs for each operation unit. Thus, by using the greedy algorithm, it is possible to select unit-group with the minimum costs and satisfying the restrictions.

Fourth Embodiment

In the first embodiment, the operation planning system was applied to electric power systems. Each operation units were electric power stations. The goal of the operation planning system was to generate a supplying plan which meets the power demand. However, the operation planning system can be applied to other fields as well. In the fourth embodiment, a case when the operation planning system is applied to the generation of production plan for factories is described. Besides the fact that the operation units are factories and the output corresponds to the amount of production, the operation planning system can be prepared with similar configurations as the examples explained above. Products that are manufactured in the factories could be any type of product.

Figure 22:
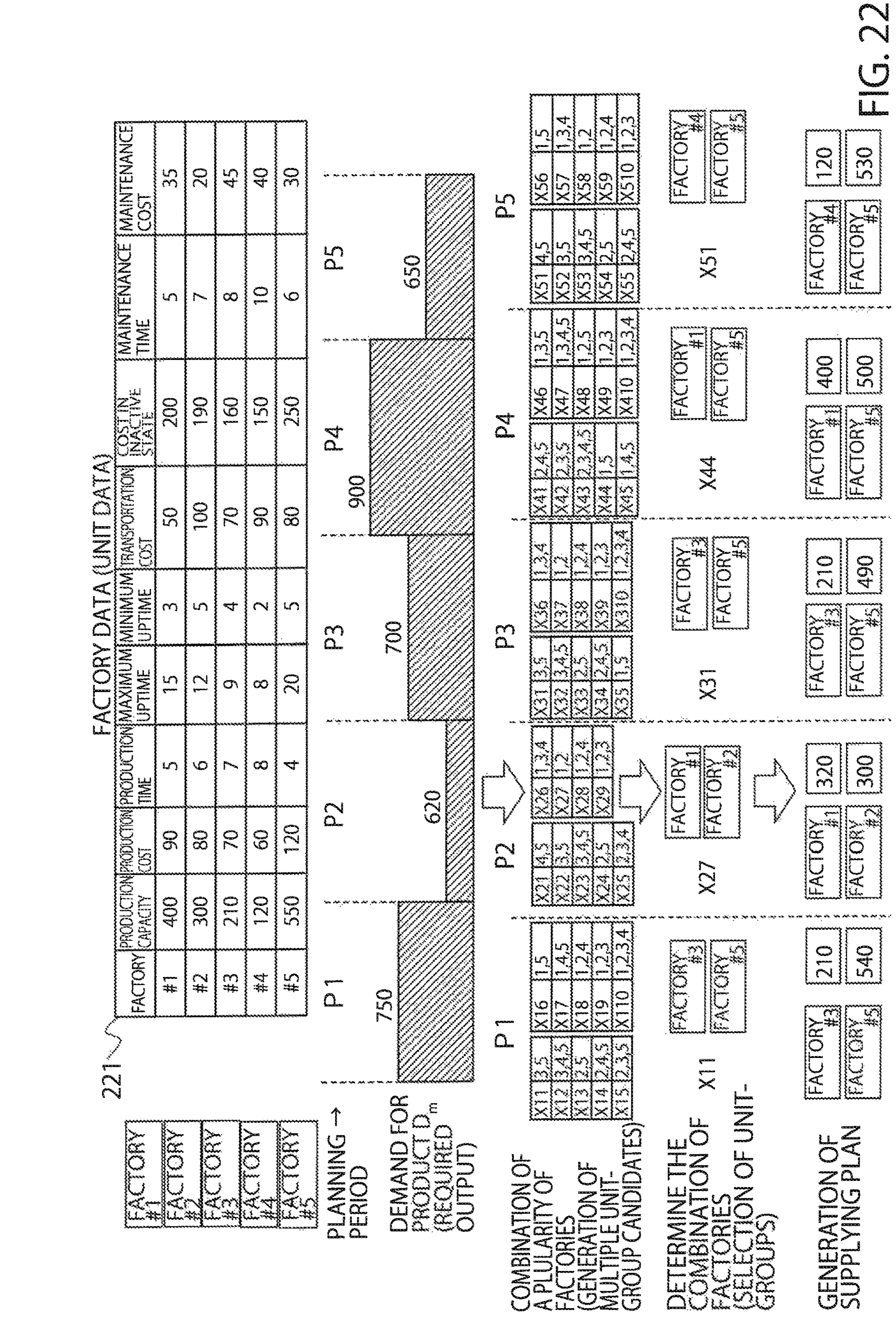
FIG. 22 is a diagram showing the application to the generation of production plans.
Figure 23:
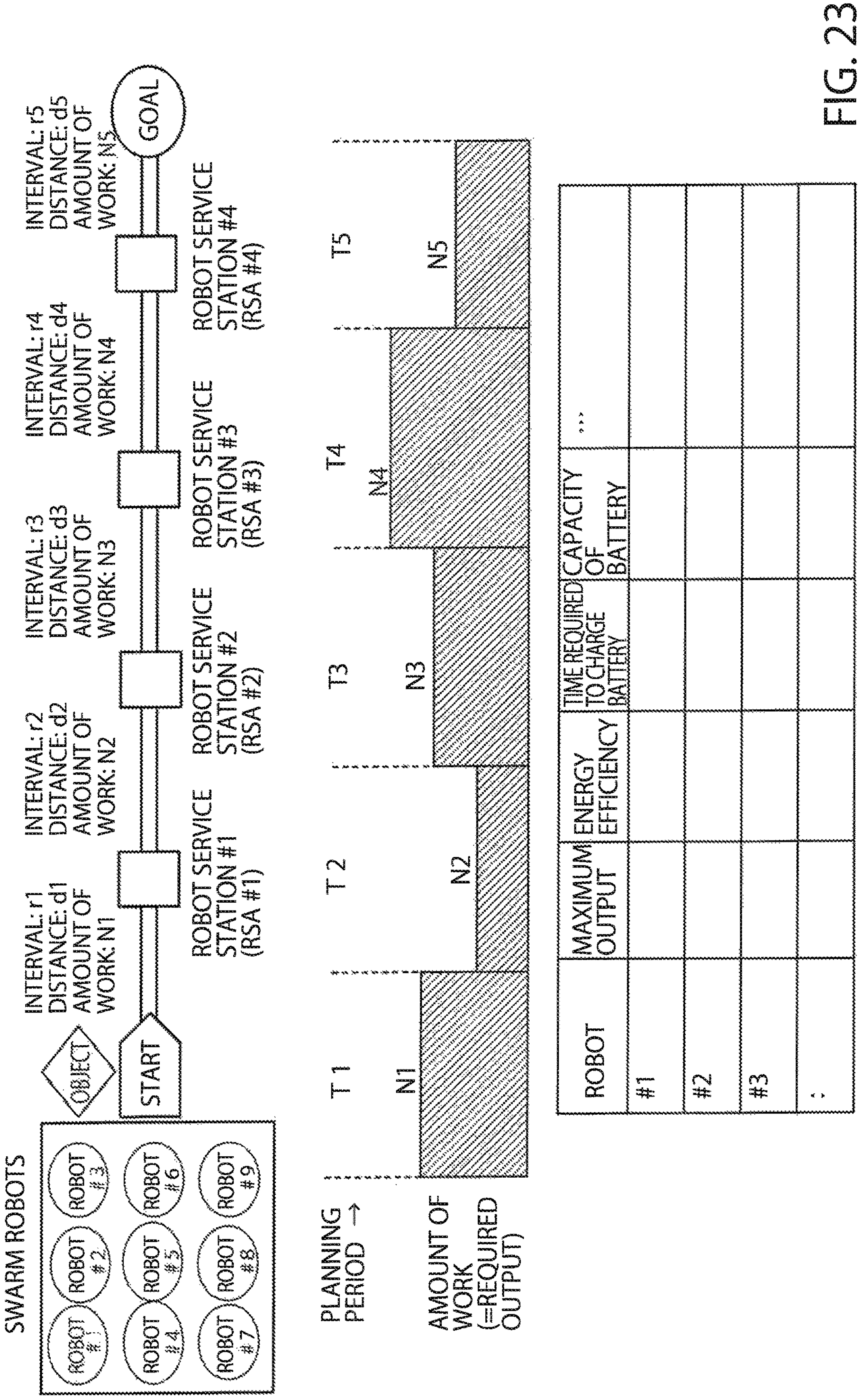
FIG. 23 is a diagram showing the application to the transportation of objects by swarm robotics.

FIG. 22 is a diagram showing the application to the generation of production plans. If products are manufactured, the unit data stored in the unit information database 56 of the management server 50 is the factory data shown in table 221. The factory data includes the production cost $Z_c$ which is the cost required to manufacture a single unit of the product, the production time which is the time required to manufacture a single unit of the product, the maximum uptime $O_{max}$ which is the maximum value of the continuous operation time, the minimum uptime $O_{min}$ which is the minimum value of the continuous operation time, the transportation cost for a single unit of the product $L_c$, the cost in inactive state $S_c$, the maintenance time, the cost required for maintenance $M_c$ or the like. The maintenance time is the time required to perform maintenance tasks when the continuous operation time reached the maximum uptime. The aforementioned indicators are only examples. Different indicators may be used. A single unit of product can be a lot of products, a container of products, a specific number of products, a specific weight of products, a specific volume of products or the storage capacity of the products.

Each factory, corresponding to the operation unit has restrictions in operations. The continuous operation time needs to be in the range of $[O_{min}, O_{max}]$. Also, if the previous continuous operation time reached the maximum uptime, the factory needs to be in standby state during the maintenance time, until the next operation. These restrictions are only examples and other restrictions may be applied.

The cost function can be defined according to the below equation (3).

$$C = Y \times Z_C + Y \times L_C + S_C + M_C \quad (3)$$

Here, Y is the amount of production. Here, it is supposed that the amount of production is the weight in unit of tons. However, it can be the number of products, the volume of products, the storage capacity of the products or any other units for weights.

In this embodiment, 5 factories including factory #1, factory #2, factory #3, factory #4 and factory #5 are manufacturing products. Considering the demand of the product, the target amount of production for planning period P1 is set to 750 tons. The target amount of production for planning period P2 is set to 620 tons. The target amount of production for planning period P3 is set to 700 tons. The target amount of production for planning period P4 is set to 900 tons. The target amount of production for planning period P5 is set to 650 tons. The target amount of production for each planning period corresponds to the required output (overall output) of the demand data.

The goal of the production planning system according to the embodiment is to generate a production plan which manufactures products equal to the target amount of production for each planning period while fulfilling the restrictions and minimizing the cost. Below, the processes executed by the system according to the embodiment are explained.

First, the planning unit which is paired with each factory is launched and the planning unit which becomes the leader unit is determined. The leader unit can be determined by using the value obtained by dividing the production capacity of each factory with the production cost. For factory #1, the value is 400/90=4.4. For factory #2, the value is 300/80=3.75. For factory #3, the value is 210/70=3.0. For factory #4, the value is 120/60=2.0. For factory #5, the value is 550/120=4.6. Since the value for factory #5 is the greatest, the planning unit paired with factory #5 becomes the leader unit. The selection of the leader unit described above is only an example. Other methods can be used to determine the leader unit.

If the required output in the demand data is $D_m$, the range for amount of production can be set to $[D_m, 1.5*D_m]$. This range for amount of production is only an example. Different ranges can be set for the amount of production.

Next, multiple combinations of factories which can yield products within the range for amount of production are generated for each planning period. This process corresponds to the generation of unit-group candidates in the first embodiment. In the example of FIG. 22, 10 unit-group candidates X11, X12, X13, X14, X15, X16, X17, X18, X19, X110 are generated for planning period P1. For planning period P2, 9 unit-group candidates are generated. For planning period P3, 10 unit-group candidates are generated. For planning period P4, 10 unit-group candidates are generated. For planning period P5, 10 unit-group candidates are generated. These processes are executed by the unit-group generator 11 of the planning unit.

Next, the combination of factories which operate in each planning period is determined. Here, the combinations of factories are determined so that the cost is minimized and the restrictions are fulfilled. This process for determining the combination of factories corresponds to the selection of unit-groups in the first embodiment. This process is executed by the unit selector 12 of the planning unit. Since determining the combinations of factories is also an optimization problem, methods such as the genetic algorithm, reinforcement learning and greedy learning can be used. In the example of FIG. 22, unit-group (combination of factories) X11 is selected for planning period P1. Unit-group X27 is selected for planning period P2. Unit-group X31 is selected for planning period P3. Unit-group X44 is selected for planning period P4. Unit-group X51 is selected for planning period P5. For example, unit-group X11 is a combination of factory #3 and factory #5.

Next, the planning units belonging to the unit-group for each planning period generates the supplying plan. The supplying plan is generated so that the production cost is minimized. This process corresponds to the generation of supplying plan in the first embodiment. This process is executed by the plan generator 14. Multiple planning units repeat the adjustment of the supplying plan, and the handovers of the authority to edit the supplying plan until the total amount of production of the factories is equal to the required output (target amount of production). The procedures executed here are as the same as the system according to the first embodiment.

For the supplying plan in the example of FIG. 22, factory #3 manufactures 210 tons of the products and factory #5 manufactures 540 tons of the products in planning period P1. In the next planning period P2, factory #1 manufactures 320 tons of the products and factory #2 manufactures 300 tons of the products. In planning period P3, factory #3 manufactures 210 tons of the products and factory #5 manufactures 490 tons of the products. In planning period P4, factory #1 manufactures 400 tons and factory #5 manufactures 500 tons of the products. In the final planning period P5, the factory

#4 manufactures 120 tons of the products and the factory #5 manufactures 530 tons of the products.

When the supplying plan is generated, each factory can start the production. If the demand of products changes or troubles occur in the factory during the generation of the plans or the operation of the factories, it is possible to regenerate the plan. The procedures for regenerating the plans are the same as the system according to the first embodiment.

Fifth Embodiment

The operation planning system can be applied to fields other than the electric power systems or manufacture of products. The fifth embodiment is an example when the operation planning system is applied to swarm robotics.

In the embodiment, each robot belonging to the swarm robotic system corresponds to the operation unit. The work required to transport an object corresponds the required output in the demand data. The planning unit is implemented on the robots. Each planning unit can communicate with other planning units and the management server by using wireless communication. Besides the aforementioned differences, the features of the components are similar to the above embodiments.

In the description below, the work performed by each robot is referred to as the amount of work. The amount of work may be physical work in units of watts. The amount of work may be also defined by the energy (in units of joules) required to transport objects.

In the system according to the embodiment, swarm robotic system including a plurality of robots transport an object from the starting point to the goal point. The route between the starting point and the goal point can be divided into multiple intervals r1, r2, r3, r4 and r5. The intervals can have equal distances or different distances. Each interval may include uphills, downhills and different road conditions. Therefore, the amount of work required to transport the object per unit distance varies depending to the interval. Intervals that are going uphill and unpaved routes require greater work to transport objects compared to intervals that are flat and have paved roads. For example, the amount of work required per unit distance for interval r1 is N1.

Since each robot is driven by secondary batteries, the amount of work that can be performed after a single battery charge is limited. If the remaining energy of the battery becomes low, the robots need to be charged at the robot service station. Until the charging of the battery is completed, the robots need to stop at the robot service stations for a certain period of time. When the robots are transporting the object, the operation units are in operating state.

When the operation plan for swarm robotic system is generated, the combination of robots which transports the object in each interval needs to be determined. The process of determining the combination of robots for each interval in the transportation route corresponds to the generation and selection of unit-groups for each planning period. The selection of unit-groups for each interval depends on the allocation of robots. For example, the robots that operate during the planning period T1 have to be selected from the robots that are located in the starting point. The robots that operate in the planning period T2 can be selected from the robots that were located in the starting point and the robot service station 1. However, robots that are stopped in robot service station 1 are excluded. Such conditions may be reflected in the restriction for selecting the unit-groups.

If a robot cannot be charged in a specific robot service station, this condition can be reflected to the restrictions, for determining the allocation of robots. The process for selecting the unit-groups, including the initial location of robots can be executed by using methods such as the genetic algorithm, reinforcement learning, the greedy algorithm or the like.

The output of each robot can be adjusted. Thus, in uphills and unpaved intervals, the output of the robots can be set to a higher value. In downhills and paved intervals, the output of the robots can be set to a lower value. Costs are required for the charging and the operation of the robots. Also, the unit cost depends on the robots. The supplying plan can be generated by calculating the unit cost and adjusting the output of each robot.

In the system according to the embodiment, the supplying plan is generated so that the cost is minimized. A plurality of planning units repeat the adjustment of the supplying plan and the handover of the authority to edit the supplying plan until the total output of the robots is equal to the amount of work (required output) for each interval. The procedures executed for this process is similar to the above embodiments. Once the generation of the supplying plan is complete, it is possible to start the transportation of the object by the swarm robots.

If there are failed robots, addition of new robots, changes in condition of the intervals or the like, it is possible to regenerate the plan without stopping the transportation of the object.

The generation of operation plan was explained for electric power systems, manufacture of products by a plurality of factories and transportation of objects by robots. The embodiment according to the invention can be applied to any system, as long as the system is a multi-unit system which performs a specific process with multiple operation units. The embodiment according to the invention can be applied to a refrigerated air conditioning system with multiple units, a heating system with multiple units or a water supplying system with multiple sources of water, for example. The embodiment according to the invention can be applied to the extraction of natural resources. For example, the extraction of oil or gas from a plurality of wells or oilfields, the extraction of minerals from a plurality of tunnels or mines, each well, oilfield, tunnel or mine corresponds to the operation unit. The status of extraction corresponds to the status of operation for the operation unit. The amount of extracted resources can be considered to be equivalent to the output.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A system comprising:

a hardware storage configured to store demand data including an overall output of electric power required for a planning period in an operation plan;

a plurality of planning devices arranged corresponding to a plurality of operation devices, the plurality of operation devices configured to generate electric power and output the electric power, and the plurality of planning devices including circuitry configured to adjust output settings of the plurality of operation devices; and a unit information database which stores unit data including failure states of the operation devices and failure states of the planning devices, wherein circuitry of any one of the plurality of planning devices selects a combination of operation devices which can generate the required overall output of electric power for the planning period in the demand data, from among the plurality of operation devices if the circuitry of any one of the plurality of planning devices detects a failure of one or more other planning devices or a failure of one or more operation devices, the circuitry of any one of the plurality of planning devices selects another one of the planning devices corresponding to the operation devices in the combination based on operation costs depending on outputs of the operation devices in the combination, and sends an authority signal for updating the operation plan to the another one of the planning devices, the circuitry of the another one of the planning devices which has received the authority signal performs a first process including to: adjust the output setting of one operation device selected from among the operation devices in the combination to update the operation plan; selects further another one of the planning devices corresponding to the operation devices in the combination based on operation costs depending on outputs of the operation devices in the combination; and sends an authority signal for updating the operation plan to the further another one of the planning devices;

the first process is iteratively performed by the circuitry of the planning device which has received the authority signal among the planning devices each time the authority signal is transmitted, and thereby the operation plan, including the output settings of the operation devices in the combination, for the planning period is generated; and wherein the operation devices in the combination are operated during the planning period according to the output settings of the operation plan generated for the planning period to generate and output power for the planning period.

2. The operation planning system according to claim 1, wherein the circuitry of the planning devices are configured to stop iterating the first process based on the difference between an overall output of the combination and the overall output required in the demand data.

3. The operation planning system according to claim 1, wherein the operation plan includes a plurality of planning periods and the overall output required for the plurality of operation devices is provided for each planning period in the demand data.

4. The operation planning system according to claim 3, wherein the circuitry of any one of the planning devices generate multiple combinations of operation devices that can generate the overall output of electric power required for each planning period in the demand data, and for each planning period in the demand data, the combination of operation devices which requires the lowest cost for switching an operating combination of operation devices to the combination of operation devices is selected as the combination of operation devices that operate.

5. The operation planning system according to claim 4, wherein when the circuitry of any one of the planning devices selects the combination of operating devices which operate during each of the planning periods in the demand data, the circuitry of any one of the planning devices ensures that a condition for starting the operation devices and a condition for stopping the operation devices is satisfied.

6. The operation planning system according to claim 1, wherein the circuitry of the planning device detects changes in the required overall output in the planning period in the demand data in a period during which the operation devices in the combination are operating according to the operation plan, and the circuitry of the planning device updates the operation plan by adding an operation device to the combination or by deleting an operation device from the combination.

7. The operation planning system according to claim 1, wherein the unit data further includes registration statuses of the operation devices and the output settings of the operation devices.

8. The operation planning system according to claim 7, wherein if the circuitry of any one of the planning devices detects at least either deletion of the operation device, or addition of the planning device in the planning period in the unit data in a period during which the operation devices in the combination are operating according to the operation plan, the system iterates to perform the first process by the circuitry of the planning device which has received the authority signal to update the operation plan.

9. The operation planning system according to claim 7, wherein the circuitry of any one of the planning devices detects at least either a failure of the operation device, deletion of the operation device or a failure of the planning device in the planning period in the unit data in a period which the operation devices in the combination are operating according to the operation plan, and the circuitry of any one of the planning devices corresponding to the combination updates the operation plan by adding an operation device to the combination.

10. The operation planning system according to claim 7, wherein if the circuitry of any of the planning devices detects addition of the operating device and addition of the planning device paired with the operation device in a period during which the operation devices in the combination are operating according to the operation plan, then the circuitry of any one of the planning devices corresponding to the combination updates the operation plan by adding the operation device to the combination of operation devices which operate during the planning period.

11. The operation planning system according to claim 1, wherein the operation devices are electric power generators or electric power stations.

12. The operation planning system according to claim 1, wherein the operation devices are production facilities or factories and the overall output required in the demand data is amount of manufactured products instead of the overall output of electric power.

13. The operation planning system according to claim 1, wherein the operation devices are robots and the overall output required in the demand data is amount of work performed by the robots instead of the overall output of electric power.

14. The operation planning system according to claim 1, wherein the circuitry of the planning device which received the authority signal calculates, in the first process, the operation costs depending on outputs of the operation devices in the combination, selects a planning device corresponding to the operation device having a greatest of the operation costs, and sends the authority signal to the selected planning device.

15. The operation planning system according to claim 1, wherein the circuitry of the planning device which received the authority signal calculates, in the first process, higher operation costs for the operation devices as the outputs of the operation devices are larger.

16. The operation planning system according to claim 1, wherein after the circuitry of the planning device which received the authority signal adjusts, in the first process, the output setting of one operation device selected from among the operation devices in the combination, the circuitry determines whether an overall output of the operation devices reaches the required overall output of electric power, and the circuitry does not send the authority signal if the overall output of the operation devices reaches the required overall output of electric power.

17. The operation planning system according to claim 1, wherein the circuitry of any one of the planning devices adjusts the output setting of one operation device selected from among the operation devices in the combination to update the operation plan.

18. A method comprising the steps of:

reading, from a hardware storage, demand data including an overall output of electric power required for a planning period in an operation plan;

determining, by any one of a plurality of planning devices arranged corresponding to a plurality of operation devices, a combination of operation devices which generate the required overall output of electric power for the planning period in the demand data from among the plurality of operation devices, the plurality of operation devices configured to generate electric power and output the electric power;

storing, in a unit information database, data including failure states of the operation devices and failure states of the planning devices;

selecting, by the circuitry of any one of the planning devices, a combination of operation devices which can generate the required overall output of electric power for the planning period in the demand data, from among the plurality of operation devices if the circuitry of any one of the planning devices detects a failure of one or more other planning devices or a failure of one or more operation devices;

selecting, by the circuitry of any one of the planning devices, another one of the planning devices corresponding to the operation devices in the combination based on operation costs depending on outputs of the operation devices in the combination, and sending an authority signal for updating the operation plan to the another one of the planning devices;

performing, by the circuitry of the another one of the planning devices which has received the authority signal, a first process including to: adjust the output setting of one operation device selected from among the operation devices in the combination to update the operation plan; select further another one of the planning devices corresponding to the operation devices in the combination based on operation costs depending on outputs of the operation devices in the combination; and send an authority signal for updating the operation plan to the further another one of the planning devices;

iteratively performing the first process by the circuitry of the planning device which has received the authority signal among the planning devices each time the authority signal is transmitted, to thereby generate the operation plan, including the output settings of the operation devices in the combination, for the planning period; and operating the operation devices in the combination during the planning period according to the output settings of the operation plan generated for the planning period to generate and output power for the planning period.

* * * * *